(12) United States Patent
Uemura et al.

(10) Patent No.: US 12,107,510 B2
(45) Date of Patent: Oct. 1, 2024

(54) POWER CONVERTING APPARATUS, AND MOTOR DRIVING APPARATUS

(71) Applicant: Mitsubishi Electric Corporation, Tokyo (JP)

(72) Inventors: Keisuke Uemura, Tokyo (JP); Kazunori Hatakeyama, Tokyo (JP); Koichi Arisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 261 days.

(21) Appl. No.: 17/618,536

(22) PCT Filed: Aug. 30, 2019

(86) PCT No.: PCT/JP2019/034294
§ 371 (c)(1),
(2) Date: Dec. 13, 2021

(87) PCT Pub. No.: WO2021/038877
PCT Pub. Date: Mar. 4, 2021

(65) Prior Publication Data
US 2022/0360192 A1 Nov. 10, 2022

(51) Int. Cl.
*H02M 7/219* (2006.01)
*H02M 1/12* (2006.01)
(Continued)

(52) U.S. Cl.
CPC ........... *H02M 7/219* (2013.01); *H02M 1/123* (2021.05); *H02M 1/4233* (2013.01); *H02P 27/08* (2013.01)

(58) Field of Classification Search
CPC ....... H02M 1/123; H02M 1/423; H02M 7/219
See application file for complete search history.

(56) References Cited

U.S. PATENT DOCUMENTS 11,159,115 B2 * 10/2021 Arisawa ............... H02M 7/5395
11,804,786 B2 * 10/2023 Uemura ................ F25B 31/026
(Continued)

FOREIGN PATENT DOCUMENTS

CN 104885351 A * 9/2015 .......... H02M 1/4225
CN 106160535 B * 8/2018 .............. F24F 13/00
(Continued)

OTHER PUBLICATIONS

International Search Report dated Nov. 26, 2019, issued in corresponding International Patent Application No. PCT/JP2019/034294 (and English Machine Translation).
(Continued)

*Primary Examiner* — Sisay G Tiku
(74) *Attorney, Agent, or Firm* — Posz Law Group, PLC

(57) ABSTRACT

A power converting apparatus includes: a reactor including a first end and a second end, the first end being connected to an alternating-current power supply; a rectifier circuit connected to the second end of the reactor and including at least one switching element, the rectifier circuit converting an alternating-current voltage output from the alternating-current power supply into a direct-current voltage; and a detecting unit that detects a physical quantity indicating an operation state of the rectifier circuit, wherein the number of times of switching of the switching element is changed depending on the operation of the rectifier circuit.

2 Claims, 16 Drawing Sheets

(51) Int. Cl.
 *H02M 1/42* (2007.01)
 *H02P 27/08* (2006.01)

(56) References Cited

U.S. PATENT DOCUMENTS

| | | | | |
|---|---|---|---|---|
| 11,811,332 | B2* | 11/2023 | Ichiki | G01R 19/16538 |
| 2017/0070157 | A1* | 3/2017 | Tsukii | H02M 1/4225 |
| 2021/0013796 | A1* | 1/2021 | Amimoto | H02M 7/537 |
| 2021/0083594 | A1* | 3/2021 | Iyasu | H02M 1/4233 |

FOREIGN PATENT DOCUMENTS

| | | |
|---|---|---|
| CN | 108599549 A | 9/2018 |
| JP | 2015-139301 A | 7/2015 |
| JP | 2018-007326 A | 1/2018 |
| JP | 2018-007328 A | 1/2018 |
| WO | 2018/074274 A1 | 4/2018 |
| WO | 2019082246 A1 | 5/2019 |

OTHER PUBLICATIONS

Extended European Search Report dated Jul. 22, 2022 issued in corresponding European Patent Application No. 19943022.4.
Office Action dated Nov. 4, 2023 issued in corresponding CN patent application No. 201980099621.0 (and English translation).
Office Action dated Dec. 14, 2023 issued in corresponding EP patent application No. 19943022.4.

* cited by examiner

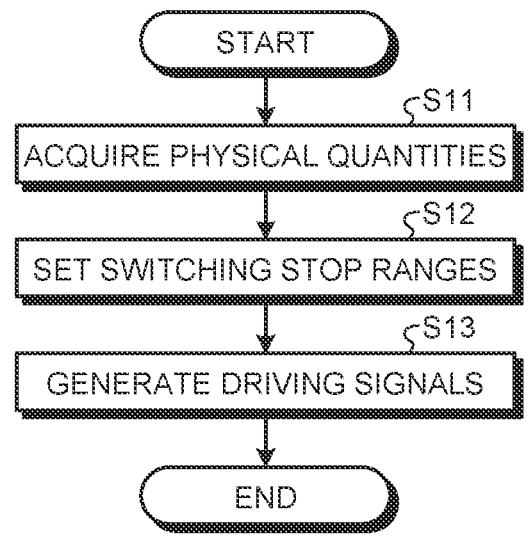
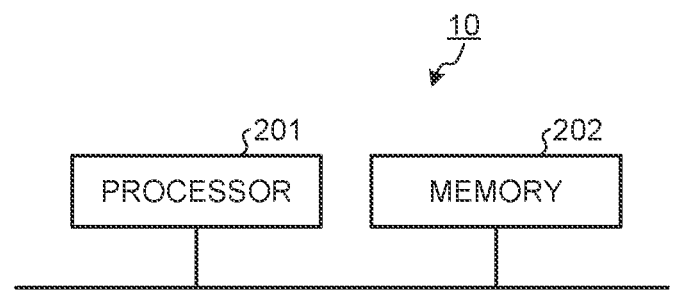

POWER CONVERTING APPARATUS, AND MOTOR DRIVING APPARATUS

CROSS REFERENCE TO RELATED APPLICATION

This application is a U.S. National Stage Application of International Patent No. PCT/JP2019/034294 filed on Aug. 30, 2019, the disclosure of which is incorporated herein by reference.

TECHNICAL FIELD

The present invention relates to a power converting apparatus that converts an alternating-current power into a direct-current power, a motor driving apparatus, and an air conditioner.

BACKGROUND

Power converting apparatuses that convert a supplied alternating-current power into a direct-current power by using a bridge circuit constituted by diodes, and output the direct-current power have been present. Recently, power converting apparatuses in which switching elements connected in parallel with diodes, that is, so-called bridgeless circuits are used have been present. A power converting apparatus in which a bridgeless circuit is used can perform control for increasing the voltage of alternating-current power, power factor correction control, synchronous rectification control for rectifying alternating-current power, and the like by turning switching elements such as metal-oxide-semiconductor field-effect transistors (MOSFETs) ON and OFF.

Patent Literature 1 teaches a technology of a power converting apparatus including a bridgeless circuit, for performing control to increase the voltage of alternating-current power, power factor correction control, synchronous rectification control to rectify alternating-current power, and the like by switching among control modes of diode rectification control, synchronous rectification control, partial switching control, and fast switching control depending on a load amount. The power converting apparatus described in Patent Literature 1 can also reduce harmonic components of a power supply current and perform power factor correction by power supply short circuit operations such as partial switching control and fast switching control.

PATENT LITERATURE

Patent Literature 1: Japanese Patent Application Laid-open No. 2018-7328

In the power converting apparatus described in Patent Literature 1, however, leakage current is caused by a charge/discharge current of a parasitic capacitance of a switching element such as a MOSFET during fast switching control. In particular, a peak of leakage current increases around a region in which the alternating current is discontinuous, more specifically, a region around a zero-crossing of an alternating-current power supply voltage including the zero-crossing. The power converting apparatus described in Patent Literature 1 therefore has a problem in that leakage current increases as a result of switching of a switching element around a zero-crossing of an alternating-current power supply voltage.

SUMMARY

The present invention has been made in view of the above, and an object thereof is to provide a power converting apparatus capable of reducing leakage current caused by switching elements.

To solve the above problem and achieve an object, a power converting apparatus according to the present invention includes: a reactor including a first end and a second end, the first end being connected to an alternating-current power supply; a rectifier circuit connected to the second end of the reactor and including at least one switching element, the rectifier circuit converting an alternating-current voltage output from the alternating-current power supply into a direct-current voltage; and a detecting unit that detects a physical quantity indicating an operation state of the rectifier circuit, wherein the number of times of switching of the switching element is changed depending on operation of the rectifier circuit.

The power converting apparatus according to the present invention produces an effect of being capable of reducing leakage current caused by switching elements.

BRIEF DESCRIPTION OF DRAWINGS

FIG. 19 is a flowchart illustrating the operation of the control unit of the power converting apparatus according to the first embodiment.

FIG. 20 is a diagram illustrating an example of a hardware configuration for implementing the control unit of the power converting apparatus according to the first embodiment.

DETAILED DESCRIPTION

A power converting apparatus, a motor driving apparatus, and an air conditioner according to certain embodiments of the present invention will be described in detail below with reference to the drawings. Note that the present invention is not limited to the embodiments.

First Embodiment

Figure 1:
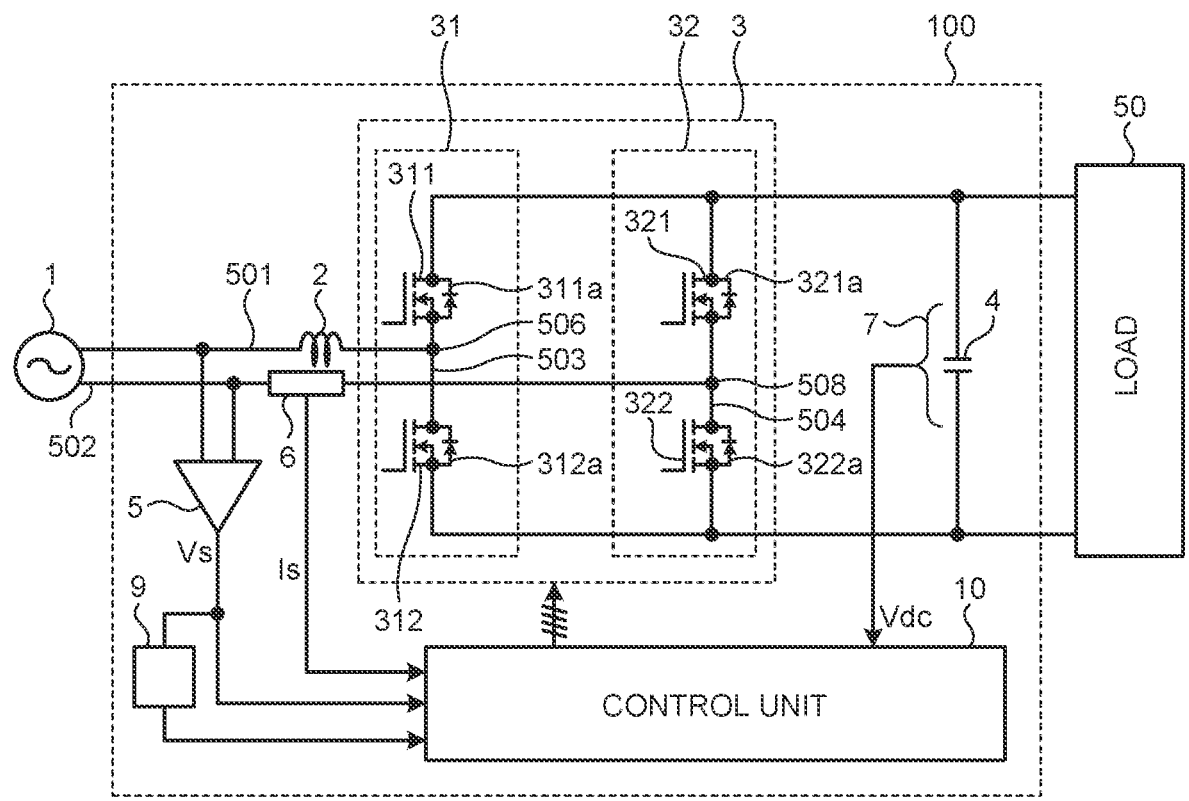
FIG. 1 is a diagram illustrating an example of a configuration of a power converting apparatus according to a first embodiment.

FIG. 1 is a diagram illustrating an example of a configuration of a power converting apparatus 100 according to a first embodiment of the present invention. The power converting apparatus 100 is a power supply device having an AC-DC converting function for converting an alternating-current power supplied from an alternating-current power supply 1 into a direct-current power and applying the direct-current power to a load 50 by using a rectifier circuit 3. As illustrated in FIG. 1, the power converting apparatus 100 includes a reactor 2, the rectifier circuit 3, a smoothing capacitor 4, a power supply voltage detecting unit 5, a power supply current detecting unit 6, a bus voltage detecting unit 7, a zero-crossing detecting unit 9, and a control unit 10. The reactor 2 includes a first end and a second end, and the first end is connected to the alternating-current power supply 1.

The rectifier circuit 3 is a circuit including two arms connected in parallel. Each of the arms includes two switching elements connected in series, and a diode is connected with each of the switching elements in parallel. Specifically, the rectifier circuit 3 includes a first arm 31, which is a first circuit, and a second arm 32, which is a second circuit. The first arm 31 includes a switching element 311 and a switching element 312, which are connected in series. A parasitic diode 311a is formed in the switching element 311. The parasitic diode 311a is connected in parallel between a drain and a source of the switching element 311. A parasitic diode 312a is formed in the switching element 312. The parasitic diode 312a is connected in parallel between a drain and a source of the switching element 312. Each of the parasitic diodes 311a and 312a is a diode used as a freewheeling diode.

The second arm 32 incudes a switching element 321 and a switching element 322, which are connected in series. The second arm 32 is connected in parallel with the first arm 31. A parasitic diode 321a is formed in the switching element 321. The parasitic diode 321a is connected in parallel between a drain and a source of the switching element 321. A parasitic diode 322a is formed in the switching element 322. The parasitic diode 322a is connected in parallel between a drain and a source of the switching element 322. Each of the parasitic diodes 321a and 322a is a diode used as a freewheeling diode.

Specifically, the power converting apparatus 100 incudes a first line 501 and a second line 502, which are each connected to the alternating-current power supply 1, and the reactor 2 disposed on the first line 501. In addition, the first arm 31 includes the switching element 311, which is a first switching element, the switching element 312, which is a second switching element, and a third line 503 having a first connection point 506. The switching element 311 is connected in series to the switching element 312 by the third line 503. The first line 501 is connected to the first connection point 506. The first connection point 506 is connected to the alternating-current power supply 1 via the first line 501 and the reactor 2. The first connection point 506 is connected to the second end of the reactor 2.

The second arm 32 includes the switching element 321, which is a third switching element, the switching element 322, which is a fourth switching element, and a fourth line 504 having a second connection point 508. The switching element 321 is connected in series to the switching element 322 by the fourth line 504. The second line 502 is connected to the second connection point 508.

The second connection point 508 is connected to the alternating-current power supply 1 via the second line 502. Note that the rectifier circuit 3 may have any configuration that includes at least one or more switching element and converts an alternating-current voltage output from the alternating-current power supply 1 into a direct-current voltage.

The smoothing capacitor 4 is a capacitor connected in parallel with the rectifier circuit 3, or more specifically, with the second arm 32. In the rectifier circuit 3, one end of the switching element 311 is connected to the positive side of the smoothing capacitor 4, the other end of the switching element 311 is connected to one end of the switching element 312, and the other end of the switching element 312 is connected to the negative side of the smoothing capacitor 4.

The switching elements 311, 312, 321, and 322 are constituted by MOSFETs. For the switching elements 311, 312, 321, and 322, MOSFETs made of wide band gap (WBG) semiconductors such as gallium nitride (GaN), silicon carbide (SiC), diamond, or aluminum nitride can be used. Use of the WBG semiconductors for the switching elements 311, 312, 321, and 322 increases the withstand voltage characteristics and also increases the allowable current density, which enables miniaturization of modules. Because the WBG semiconductors also have high heat resistance, radiating fins in a radiating unit can also be miniaturized.

Figure 2:
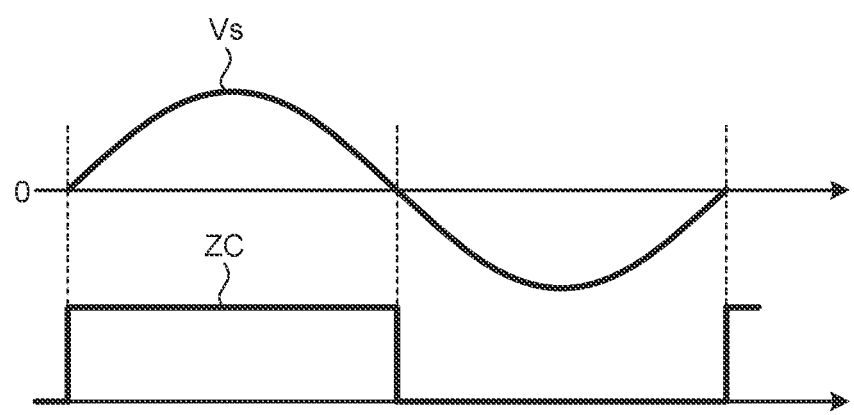
FIG. 2 is a chart illustrating a zero-crossing signal output by a zero-crossing detecting unit of the power converting apparatus according to the first embodiment.

The control unit 10 generates driving signals for causing the switching elements 311, 312, 321, and 322 of the rectifier circuit 3 to operate on the basis of signals output from the power supply voltage detecting unit 5, the power supply current detecting unit 6, the bus voltage detecting unit 7, and the zero-crossing detecting unit 9. The power supply voltage detecting unit 5 is a voltage detecting unit that detects a power supply voltage Vs, which is a voltage value of a voltage output from the alternating-current power supply 1, and outputs an electrical signal indicating the detection result to the control unit 10. The power supply current detecting unit 6 is a current detecting unit that detects a power supply current Is, which is a current value of a current output from the alternating-current power supply 1, and outputs an electrical signal indicating the detection result to the control unit 10. The power supply current Is is a current value of a current flowing between the alternating-current power supply 1 and the rectifier circuit 3. Note that, because the power supply current detecting unit 6 only needs to detect a current flowing through the rectifier circuit 3, the installation position thereof is not limited to the example of FIG. 1, and the installation position may be between the rectifier circuit 3 and the smoothing capacitor 4 or between the smoothing capacitor 4 and the load 50. The bus voltage detecting unit 7 is a voltage detecting unit that detects a bus voltage Vdc, and outputs an electrical signal indicating the detection result to the control unit 10. The bus voltage Vdc is a voltage obtained by smoothing a voltage output from the rectifier circuit 3 by the smoothing capacitor 4. The zero-crossing detecting unit 9 outputs a high or low zero-crossing (ZC) signal depending on the power supply voltage Vs of the alternating-current power supply 1 to the control unit 10. FIG. 2 is a chart illustrating a zero-crossing signal output by the zero-crossing detecting unit 9 of the power converting apparatus 100 according to the first embodiment. While the zero-crossing detecting unit 9 outputs a high zero-crossing signal when the power supply voltage Vs has positive polarity and outputs a low zero-crossing signal when the power supply voltage Vs has negative polarity in the example of FIG. 2, the zero-crossing detecting unit 9 is not limited thereto, and may output zero-crossing signals where high and low in the example of FIG. 2 are inverted.

In the description below, each of the power supply voltage detecting unit 5, the power supply current detecting unit 6, the bus voltage detecting unit 7, and the zero-crossing detecting unit 9 may be simply referred to as a detecting unit. In addition, each of the power supply voltage Vs detected by the power supply voltage detecting unit 5, the power supply current Is detected by the power supply current detecting unit 6, the bus voltage Vdc detected by the bus voltage detecting unit 7, and the zero-crossing signal output from the zero-crossing detecting unit 9 may be referred to as a physical quantity indicating the operation state of the rectifier circuit 3. The control unit 10 controls ON and OFF of the switching elements 311, 312, 321, and 322 depending on the power supply voltage Vs, the power supply current Is, the bus voltage Vdc, and the zero-crossing signal. Note that the control unit 10 may control ON and OFF of the switching elements 311, 312, 321, and 322 by using at least one of the power supply voltage Vs, the power supply current Is, the bus voltage Vdc, and the zero-crossing signal.

Next, basic operation of the power converting apparatus 100 according to the first embodiment will be described. Hereinafter, the switching elements 311 and 321 connected to the positive side of the alternating-current power supply 1, that is, a positive terminal of the alternating-current power supply 1 may also be referred to as upper switching elements. In addition, the switching elements 312 and 322 connected to the negative side of the alternating-current power supply 1, that is, a negative terminal of the alternating-current power supply 1 may also be referred to as lower switching elements.

In the first arm 31, the upper switching element and the lower switching element operate complementarily. Specifically, when one of the upper switching element and the lower switching element is ON, the other is OFF. As will be described later, the switching elements 311 and 312 constituting the first arm 31 are driven by PWM signals that are driving signals generated by the control unit 10. The operations of turning the switching elements 311 and 312 ON or OFF in accordance with the PWM signals will hereinafter also be referred to as switching operations. In order to prevent a short circuit of the smoothing capacitor 4 via the alternating-current power supply 1 and the reactor 2, the switching element 311 and the switching element 312 are both OFF when the absolute value of the power supply current Is output from the alternating-current power supply 1 is equal to or smaller than a current threshold. Hereinafter, the short circuit of the smoothing capacitor 4 will be referred to as a capacitor short circuit. The capacitor short circuit is a state in which the energy stored in the smoothing capacitor 4 is released and the current is regenerated back to the alternating-current power supply 1.

The switching elements 321 and 322 constituting the second arm 32 are turned ON or OFF by driving signals generated by the control unit 10. Basically, the switching elements 321 and 322 become an ON or OFF state depending on a power supply voltage polarity that is the polarity of a voltage output from the alternating-current power supply 1. Specifically, when the power supply voltage polarity is positive, the switching element 322 is ON and the switching element 321 is OFF, and when the power supply voltage polarity is negative, the switching element 321 is ON and the switching element 322 is OFF. Note that, in FIG. 1, an arrow extending from the control unit 10 toward the rectifier circuit 3 represents driving signals for controlling ON and OFF of the switching elements 321 and 322 and the aforementioned PWM signals for controlling ON and OFF of the switching elements 311 and 312.

Figure 3:
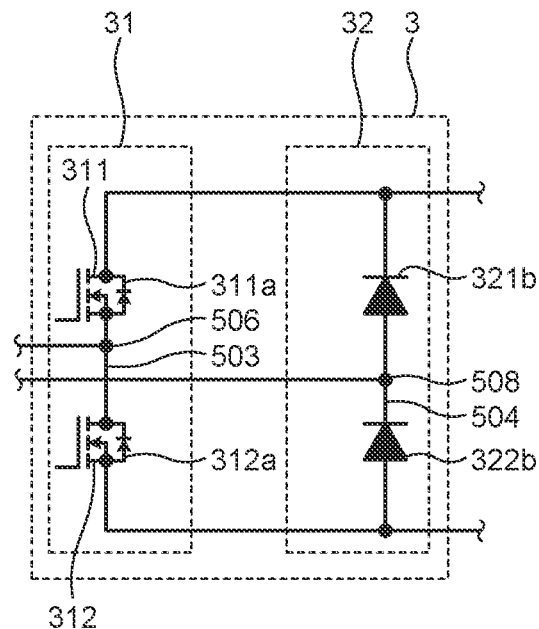
FIG. 3 is a diagram illustrating another example of a rectifier circuit included in the power converting apparatus according to the first embodiment.

While only the parasitic diodes 311a, 312a, 321a, and 322a are illustrated regarding the switching elements 311, 312, 321, and 322, respectively, in the power converting apparatus 100 illustrated in FIG. 1, this is an example, and diodes such as rectifier diodes or schottky-barrier diodes may be additionally connected in parallel with the switching elements 311, 312, 321, and 322. In addition, while the rectifier circuit 3 has a configuration including four switching elements 311, 312, 321, and 322 in the power converting apparatus 100 illustrated in FIG. 1, two switching elements of one arm may be removed, so that the arm is constituted by two diodes. FIG. 3 is a diagram illustrating another example of the rectifier circuit 3 included in the power converting apparatus 100 according to the first embodiment. FIG. 3 illustrates an example in which the second arm 32 is constituted by two diodes 321b and 322b. The rectifier circuit 3 may thus have a circuit configuration including both the switching elements 311 and 312 and the diodes 321b and 322b. The circuit configuration as illustrated in FIG. 3 can also produce the advantageous effects of the present embodiment. In the case of the configuration of the rectifier circuit 3 illustrated in FIG. 3, however, the power converting apparatus 100 controls ON and OFF of the switching elements 311 and 312. Hereinafter, the description will refer to the power converting apparatus 100 illustrated in FIG. 1 as an example.

Next, the relation between the states of the switching elements 311, 312, 321, and 322 in the first embodiment and the path of current flowing in the power converting apparatus 100 according to the first embodiment will be explained. Note that the structure of the MOSFETs will be described with reference to FIG. 4 before the explanation.

Figure 4:
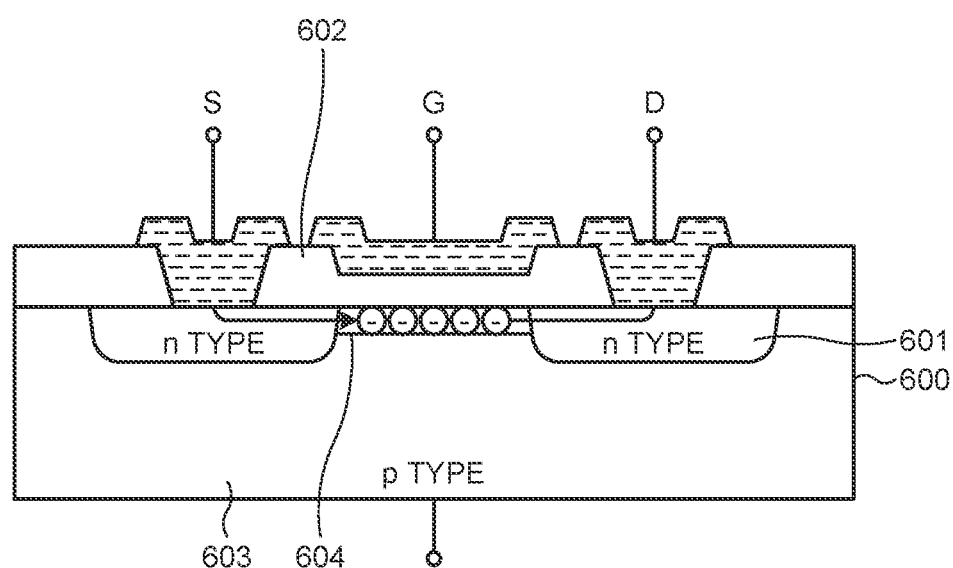
FIG. 4 is a schematic cross-sectional view illustrating an outline structure of a MOSFET constituting switching elements according to the first embodiment.

FIG. 4 is a schematic cross-sectional view illustrating an outline structure of a MOSFET constituting the switching elements 311, 312, 321, and 322 according to the first embodiment. FIG. 4 illustrates an example of an n-type MOSFET. In an n-type MOSFET, a p-type semiconductor substrate 600 is used as illustrated in FIG. 4. A source electrode S, a drain electrode D, and a gate electrode G are formed on the semiconductor substrate 600. High-concentration impurity is introduced by ion implantation into portions in contact with the source electrode S and the drain electrode D to form n-type regions 601. In addition, an insulating oxide layer 602 is formed between a portion of the semiconductor substrate 600 where no n-type region 601 is formed and the gate electrode G. Thus, the insulating oxide layer 602 is present between the gate electrode G and a p-type region 603 of the semiconductor substrate 600.

When a positive voltage is applied to the gate electrode G, electrons are attracted to an interface between the p-type region 603 and the insulating oxide layer 602 of the semiconductor substrate 600, and the interface is negatively charged. The electron density of a portion where electrons have gathered becomes higher than a hole density, and the portion becomes n-type. The portion that has become n-type serves as a current path, and will be referred to as a channel 604. The channel 604 is an n-type channel in the example of FIG. 4. When the MOSFET is controlled to be ON, more current flows to the channel 604 than to a parasitic diode formed in the p-type region 603.

Figure 5:
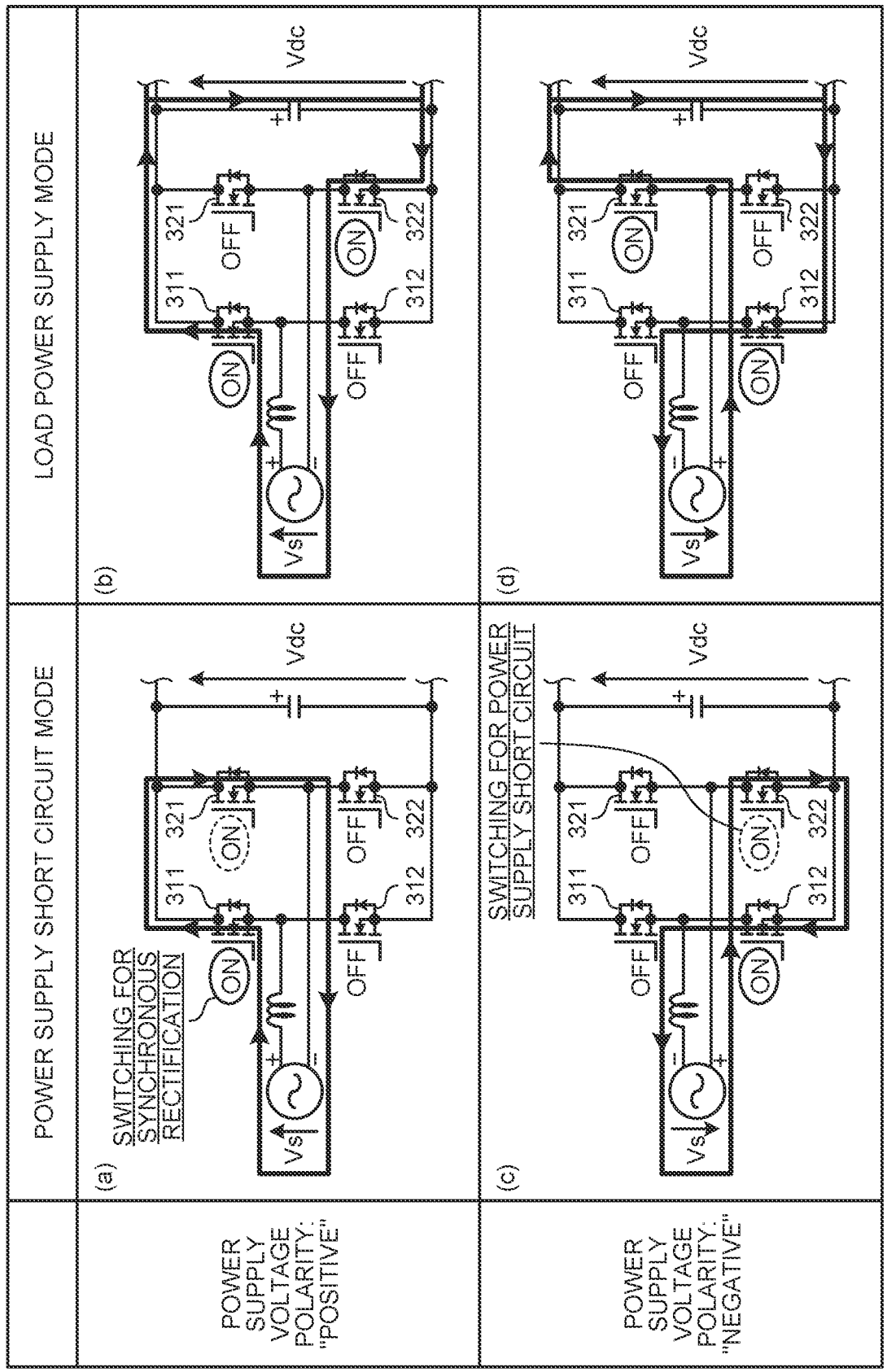
FIG. 5 is a diagram illustrating paths of current flowing in the power converting apparatus according to the first embodiment.

FIG. 5 is a diagram illustrating paths of current flowing in the power converting apparatus 100 according to the first embodiment. In FIG. 5, for simplicity of illustration, reference numerals are described only for the switching elements 311, 312, 321, and 322. In addition, in FIG. 5, switching elements that are ON for synchronous rectification control are indicated by solid line circles, and switching elements that are ON for power supply short circuit are indicated by dotted line circles.

FIG. 5(a) is a diagram illustrating a path of current flowing in the power converting apparatus 100 according to the first embodiment when the absolute value of the power supply current Is is larger than the current threshold and the power supply voltage polarity is positive. In FIG. 5(a), the power supply voltage polarity is positive, the switching element 311 and the switching element 321 are ON, and the switching element 312 and the switching element 322 are OFF. The switching element 311 is ON for synchronous rectification control, and the switching element 321 is ON for power supply short circuit. FIG. 5(a) illustrates a state in a power supply short circuit mode when the power supply voltage polarity is positive.

In this state, current flows in the order of the alternating-current power supply 1, the reactor 2, the switching element 311, the switching element 321, and the alternating-current power supply 1, and a power supply short circuit path that does not pass through the smoothing capacitor 4 is formed. Thus, in the first embodiment, the power supply short circuit path is formed in such a manner that current flows through each of the channels of the switching element 311 and the switching element 321 instead of flowing through the parasitic diode 311a and the parasitic diode 321a.

FIG. 5(b) is a diagram illustrating a path of current flowing in the power converting apparatus 100 according to the first embodiment when the absolute value of the power supply current Is is larger than the current threshold and the power supply voltage polarity is positive. In FIG. 5(b), the power supply voltage polarity is positive, the switching element 311 and the switching element 322 are ON, and the switching element 312 and the switching element 321 are OFF. The switching element 311 and the switching element 322 are ON for synchronous rectification control. FIG. 5(b) illustrates a state in a load power supply mode when the power supply voltage polarity is positive. In this state, current flows in the order of the alternating-current power supply 1, the reactor 2, the switching element 311, the smoothing capacitor 4, the switching element 322, and the alternating-current power supply 1. Thus, in the first embodiment, synchronous rectification control is performed in such a manner that current flows through each of the channels of the switching element 311 and the switching element 322 instead of flowing through the parasitic diode 311a and the parasitic diode 322a.

FIG. 5(c) is a diagram illustrating a path of current flowing in the power converting apparatus 100 according to the first embodiment when the absolute value of the power supply current Is is larger than the current threshold and the power supply voltage polarity is negative. In FIG. 5(c), the power supply voltage polarity is negative, the switching element 312 and the switching element 322 are ON, and the switching element 311 and the switching element 321 are OFF. The switching element 312 is turned ON for synchronous rectification control, and the switching element 322 is turned ON for power supply short circuit. FIG. 5(c) illustrates a state in the power supply short circuit mode when the power supply voltage polarity is negative. In this state, current flows in the order of the alternating-current power supply 1, the switching element 322, the switching element 312, the reactor 2, and the alternating-current power supply 1, and a power supply short circuit path that does not pass through the smoothing capacitor 4 is formed. Thus, in the first embodiment, the power supply short circuit path is formed in such a manner that current flows through each of the channels of the switching element 322 and the switching element 312 instead of flowing through the parasitic diode 322a and the parasitic diode 312a.

FIG. 5(d) is a diagram illustrating a path of current flowing in the power converting apparatus 100 according to the first embodiment when the absolute value of the power supply current Is is larger than the current threshold and the power supply voltage polarity is negative. In FIG. 5(d), the power supply voltage polarity is negative, the switching element 312 and the switching element 321 are ON, and the switching element 311 and the switching element 322 are OFF. The switching element 312 and the switching element 321 are turned ON for synchronous rectification control. FIG. 5(d) illustrates a state in the load power supply mode when the power supply voltage polarity is negative. In this state, current flows in the order of the alternating-current power supply 1, the switching element 321, the smoothing capacitor 4, the switching element 312, the reactor 2, and the alternating-current power supply 1. Thus, in the first embodiment, synchronous rectification control is performed in such a manner that current flows through each of the channels of the switching element 321 and the switching element 312 instead of flowing through the parasitic diode 321a and the parasitic diode 312a.

The control unit 10 can control the values of the power supply current Is and the bus voltage Vdc by controlling switching among the current paths described above. Specifically, the control unit 10 performs power factor correction control and boost control by controlling ON and OFF of the switching elements 311, 312, 321, and 322 to generate a current path for power supply short circuit via the reactor 2. The power converting apparatus 100 performs operations such as increase of the bus voltage Vdc and synchronous rectification control of the power supply current Is by continuously switching between the load power supply mode illustrated in FIG. 5(b) and the power supply short circuit mode illustrated in FIG. 5(a) when the power supply voltage polarity is positive, and continuously switching between the load power supply mode illustrated in FIG. 5(d) and the power supply short circuit mode illustrated in FIG. 5(c) when the power supply voltage polarity is negative. Specifically, the control unit 10 controls ON and OFF of the switching elements 311, 312, 321, and 322 with a switching frequency of the switching elements 311 and 312, which perform switching operations by the PWM, being higher than a switching frequency of the switching elements 321 and 322, which perform switching operations depending on the polarity of the power supply voltage Vs. In the description below, the switching elements 311, 312, 321, and 322 may simply be referred to as switching elements when the switching elements 311, 312, 321, and 322 are not distinguished from one another. Similarly, the parasitic diodes 311a, 312a, 321a, and 322a may simply be referred to as parasitic diodes when the parasitic diodes 311a, 312a, 321a, and 322a are not distinguished from one another.

Note that the switching patterns of the individual switching elements illustrated in FIG. 5 are an example, and the power converting apparatus 100 can also form current paths other than those of the switching patterns of the switching elements illustrated in FIG. 5.

The power converting apparatus 100 can produce the advantageous effects of the present embodiment with any of the switching patterns.

Figure 6:
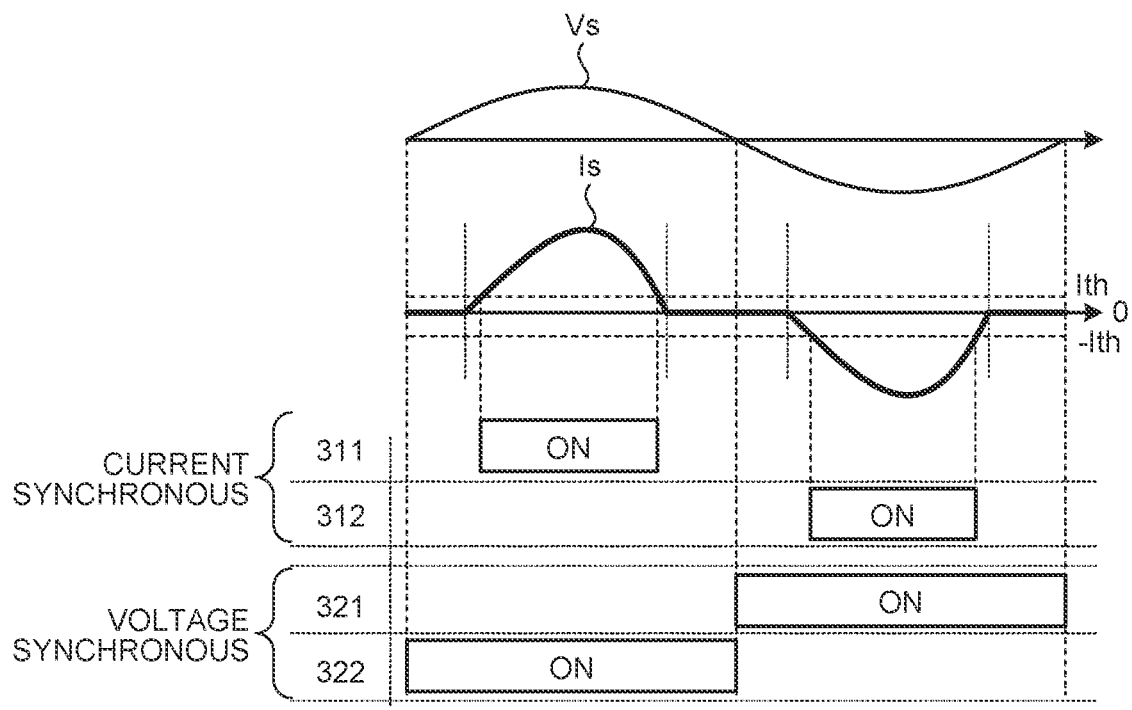
FIG. 6 is a chart illustrating the timings at which a control unit turns switching elements ON in the power converting apparatus according to the first embodiment.

Next, the timings at which the control unit 10 turns the switching elements ON and OFF will be explained. FIG. 6 is a chart illustrating the timings at which the control unit 10 turns the switching elements ON in the power converting apparatus 100 according to the first embodiment. In FIG. 6, the horizontal axis represents time. In FIG. 6, Vs represents a power supply voltage Vs detected by the power supply voltage detecting unit 5, and Is represents a power supply current Is detected by the power supply current detecting unit 6. In FIG. 6, the switching elements 311 and 312 are current-synchronous switching elements, which are controlled to be turned ON or OFF depending on the polarity of the power supply current Is, and the switching elements 321 and 322 are voltage-synchronous switching elements, which are controlled to be turned ON or OFF depending on the polarity of the power supply voltage Vs. In addition, in FIG. 6, Ith represents the current threshold. While one period of an alternating-current power output from the alternating-current power supply 1 is illustrated in FIG. 6, assume that the control unit 10 also performs control similar to that illustrated in FIG. 6 in other periods.

When the polarity of the power supply voltage is positive, the control unit 10 turns the switching element 322 ON and the switching element 321 OFF. In addition, when the polarity of the power supply voltage is negative, the control unit 10 turns the switching element 321 ON, and the switching element 322 OFF. While the timing at which the switching element 322 is switched from ON to OFF is the same as the timing at which the switching element 321 is switched from OFF to ON in FIG. 6, the timings are not limited thereto. The control unit 10 may set a dead time during which the switching elements 321 and 322 are both OFF between the timing at which the switching element 322 is switched from ON to OFF and the timing at which the switching element 321 is switched from OFF to ON. Similarly, the control unit 10 may set a dead time during which the switching elements 321 and 322 are both OFF between the timing at which the switching element 321 is switched from ON to OFF and the timing at which the switching element 322 is switched from OFF to ON.

In the case where the power supply voltage polarity is positive, the control unit 10 turns the switching element 311 ON when the absolute value of the power supply current Is becomes equal to or larger than the current threshold Ith. Thereafter, the absolute value of the power supply current Is becomes smaller, and when the absolute value of the power supply current Is becomes smaller than the current threshold Ith, the control unit 10 turns the switching element 311 OFF. In the case where the power supply voltage polarity is negative, the control unit 10 turns the switching element 312 ON when the absolute value of the power supply current Is becomes equal to or larger than the current threshold Ith. Thereafter, the absolute value of the power supply current Is becomes smaller, and when the absolute value of the power supply current Is becomes smaller than the current threshold Ith, the control unit 10 turns the switching element 312 OFF.

When the absolute value of the power supply current Is is equal to or smaller than the current threshold Ith, the control unit 10 performs control so that the switching element 311 and the switching element 321, which are the upper switching elements, are not ON at the same time, and so that the switching element 312 and the switching element 322, which are the lower switching elements, are not ON at the same time. As a result, the control unit 10 can prevent a capacitor short circuit in the power converting apparatus 100. The control unit 10 turns the switching elements ON and OFF as illustrated in FIG. 6, which can improve the efficiency of the power converting apparatus 100.

Figure 7:
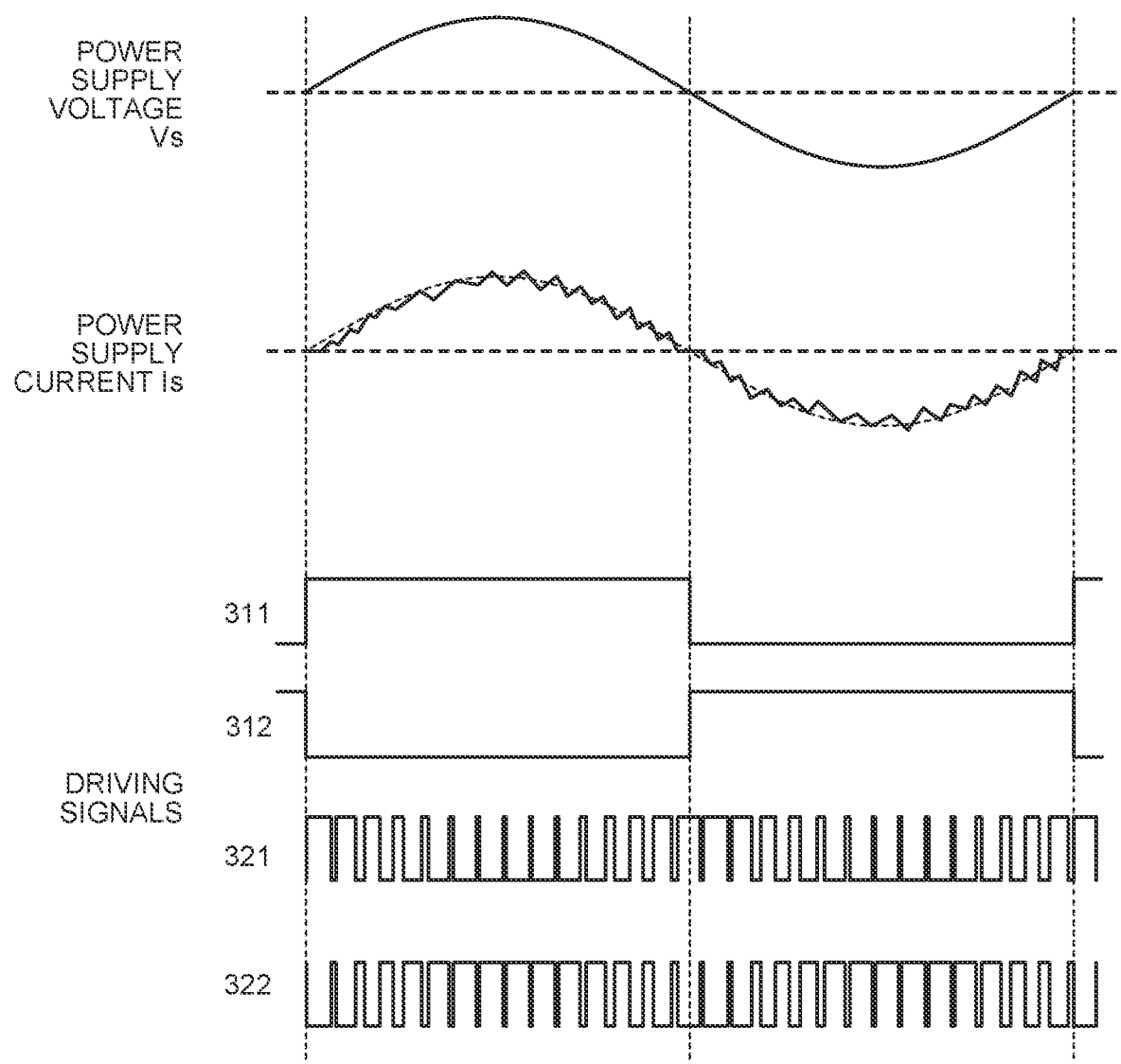
FIG. 7 is a chart illustrating an example of operation waveforms in power factor correction control in a power supply short circuit mode of the power converting apparatus according to the first embodiment.

FIG. 7 is a chart illustrating an example of operation waveforms in the power factor correction control in the power supply short circuit mode of the power converting apparatus 100 according to the first embodiment. The power factor correction control performed by the power converting apparatus 100 is also referred to as full pulse amplitude modulation (PAM) control. The switching elements 311 and 312 perform switching for synchronous rectification control in accordance with driving signals illustrated in FIG. 7. In contrast, the switching elements 321 and 322 perform switching in accordance with driving signals illustrated in FIG. 7, that is, PWM signals with frequencies of several kHz or higher. The power converting apparatus 100 repeats the power supply short circuit mode and the load power supply mode illustrated in FIG. 5 and controls the power supply current in a state of a sine wave by turning the switching elements 321 and 322 ON and OFF at frequencies of several kHz or higher. While the waveforms indicate that the switching elements 321 and 322 as a pair complementarily perform switching in FIGS. 5 and 7, this function may be performed by the switching elements 311 and 312. In addition, although a plurality of current paths for forming the power supply short circuit mode are present in the circuit configuration of the power converting apparatus 100 illustrated in FIG. 1, the current paths only differ from each other in combination of ON and OFF states of the switching elements, and any of the current paths may be used.

Figure 8:
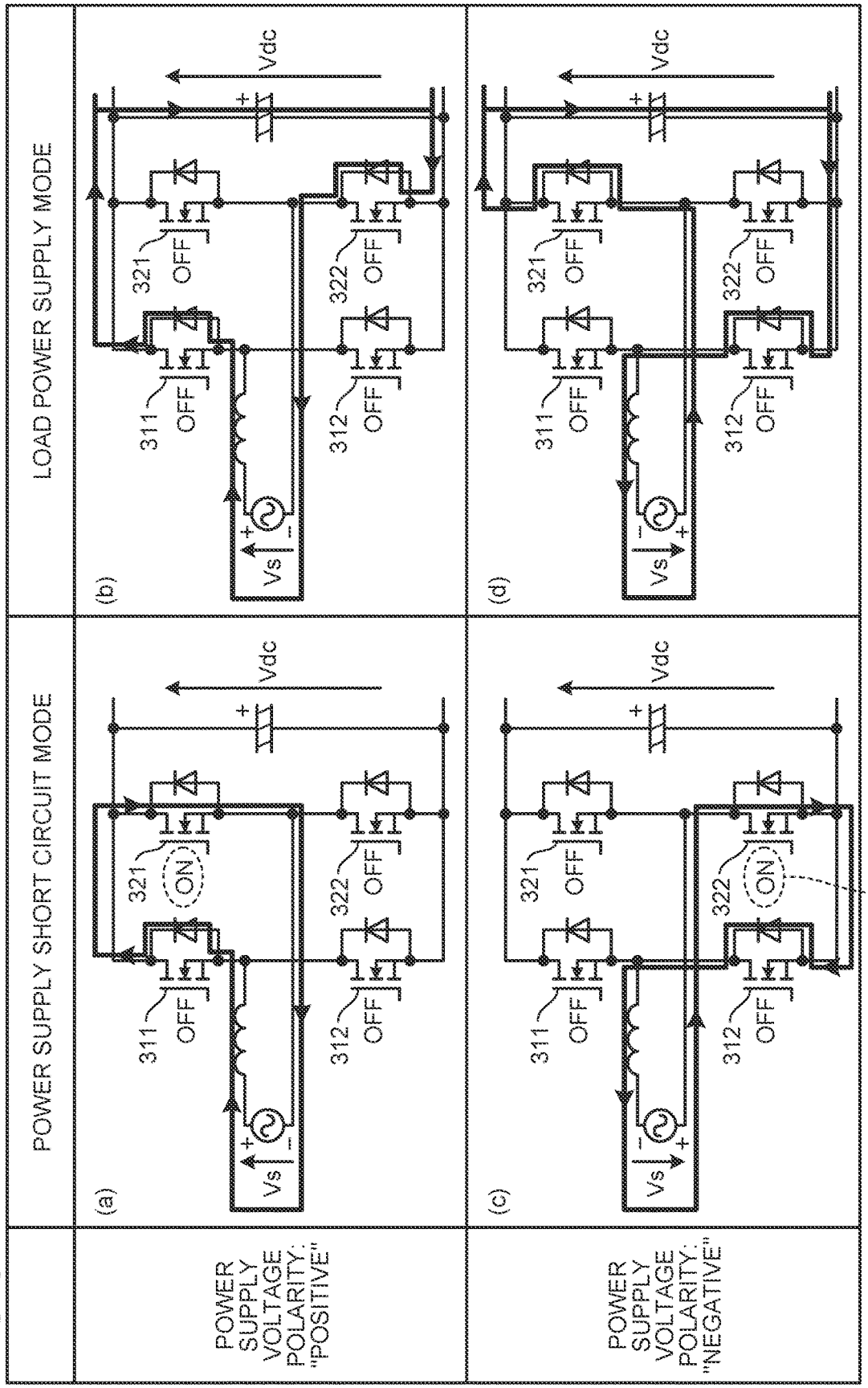
FIG. 8 is a diagram illustrating another example of paths of current flowing in the power converting apparatus according to the first embodiment.

The example of FIG. 5 is on the assumption that the synchronous rectification control is performed at the same time as the power supply short circuit mode or the load power supply mode in the power converting apparatus 100. In the power converting apparatus 100, however, control can be performed by also using in combination diode rectification control as illustrated in FIG. 8. FIG. 8 is a diagram illustrating another example of paths of current flowing in the power converting apparatus 100 according to the first embodiment. In FIG. 8, the switching elements indicated by solid line circles in FIG. 5 are all OFF. This is because, in a case where the switching elements are MOSFETs, current paths using parasitic diodes of the MOSFETs are present. As illustrated in FIG. 8, the control unit 10 can achieve the power supply short circuit mode and the load power supply mode even when the switching elements other than those performing switching for power supply short circuit are OFF. As described above, with the circuit configuration illustrated in FIG. 1, the control unit 10 can cause the power converting apparatus 100 to perform desired operations without necessarily performing synchronous rectification control. While FIG. 8 illustrates switching patterns of the switching elements under a condition that synchronous rectification control is completely stopped, the control unit 10 may perform control by using both of the synchronous rectification control illustrated in FIG. 5 and the diode rectification control illustrated in FIG. 8. Hereinafter, the description will refer to the current paths in FIG. 5 as an example.

Figure 9:
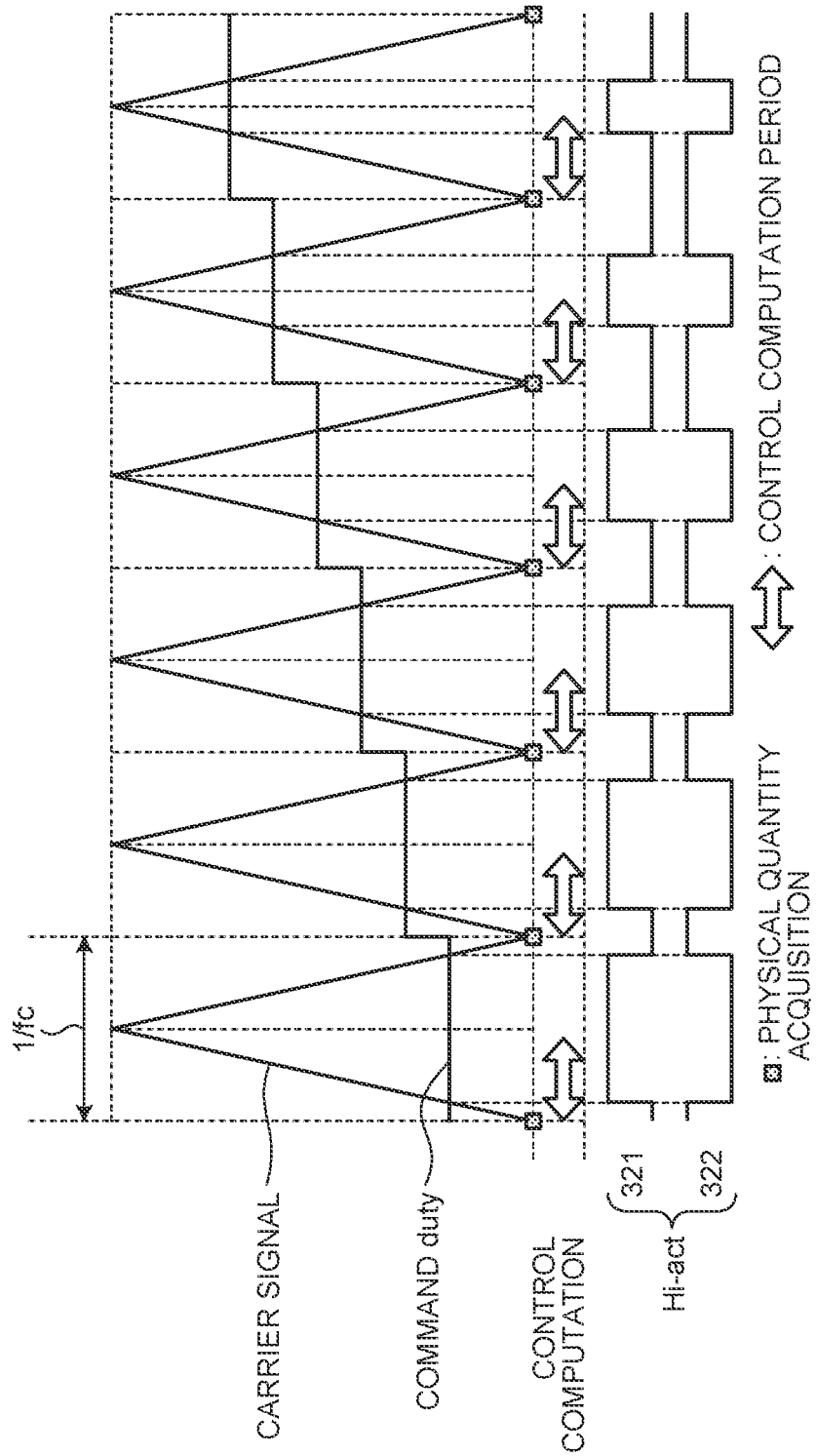
FIG. 9 is a diagram illustrating a method for generating typical PWM signals for turning switching elements ON and OFF in the power converting apparatus according to the first embodiment.

A method for generating PWM signals for turning the switching elements 321 and 322 ON and OFF at frequencies of several kHz or higher in FIG. 7 will be explained. FIG. 9 is a diagram illustrating a method for generating typical PWM signals for turning the switching elements 321 and 322 ON and OFF in the power converting apparatus 100 according to the first embodiment. In the power converting apparatus 100, the control unit 10 compares a carrier signal of a triangular wave with a command duty to generate PWM signals for turning high-active switching elements 321 and 322 ON and OFF. While the carrier signal is a triangular wave in FIG. 9, this is an example, and the carrier signal may have any signal shape as long as PWM signals can be generated. As illustrated in FIG. 9, the control unit 10 acquires physical quantities such as the power supply voltage Vs detected by the power supply voltage detecting unit 5, the power supply current Is detected by the power supply current detecting unit 6, and the bus voltage Vdc detected by the bus voltage detecting unit 7 at timings of bottoms of the carrier signal with a carrier frequency fc, and performs control computation during control computation periods illustrated in FIG. 9.

FIG. 9 illustrates an example in which the high-active switching element 321 is ON and the high-active switching element 322 is OFF in a section in which the carrier signal is larger than the command duty, and the high-active switching element 322 is ON and the high-active switching element 321 is OFF in a section in which the command duty is larger than the carrier signal. The control unit 10 reflects the command duty obtained as a result of control computation at a timing of the next bottom of the carrier signal. The control unit 10 repeats the control computation and the process of reflecting the command duty in this manner. While the control unit 10 acquires a physical quantity from each detecting unit at the timing of each bottom of the carrier signal in FIG. 9, the timing at which a physical quantity is acquired from each detecting unit is not limited to each bottom of the carrier signal. In addition, control computation periods are schematically illustrated in FIG. 9, and the actual control computation periods of the control unit 10 may be longer or shorter than the control computation periods illustrated in FIG. 9.

Figure 10:
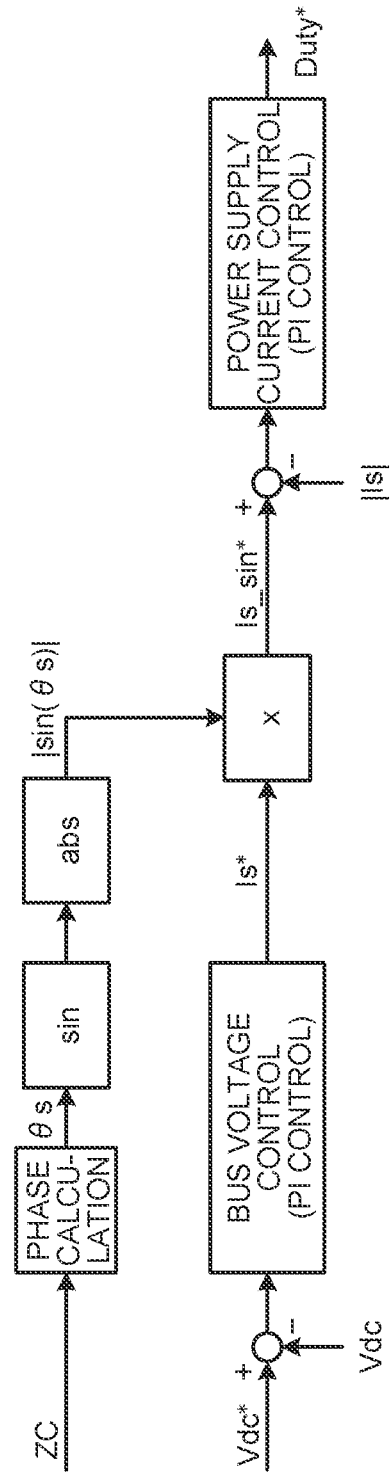
FIG. 10 is a diagram illustrating an example of a configuration for computing a command duty in the control unit of the power converting apparatus according to the first embodiment.

FIG. 10 is a diagram illustrating an example of a configuration for computing the command duty in the control unit 10 of the power converting apparatus 100 according to the first embodiment. As illustrated in FIG. 10, the control unit 10 has a control configuration in which bus voltage control is a major loop and power supply current control is a minor loop. The bus voltage control is constituted by proportional integral (PI) control, for example. The control unit 10 outputs a current command value Is* by the PI control on the basis of a difference between a bus voltage command value Vdc* and the bus voltage Vdc. The power supply current control is also constituted by PI control, for example. The control unit 10 outputs Duty*, which is a command duty, by the PI control on the basis of a difference between a power supply current command value Is_sin* and |Is|, which is the absolute value of the power supply current Is. Note that, because an alternating current is in a state of a sine wave, Is_sin*, which is a command in the power supply current control has to be an alternating current signal. The control unit 10 thus calculates a command value by multiplying Is*, which is an output of the bus voltage control, by |sin(θs)|, which is an absolute value of a sine wave signal sin(θs). Note that θs represents the phase of the power supply voltage Vs calculated from a signal correlated with a voltage value acquired from the power supply voltage detecting unit 5. Specifically, the control unit 10 calculates a phase θs by phase calculation using a zero-crossing (ZC) signal acquired from the zero-crossing detecting unit 9 as a signal correlated with the voltage value, and generates the sine wave signal sin(θs) by using the phase θs. In FIG. 10, abs represents a function for obtaining an absolute value.

Figure 11:
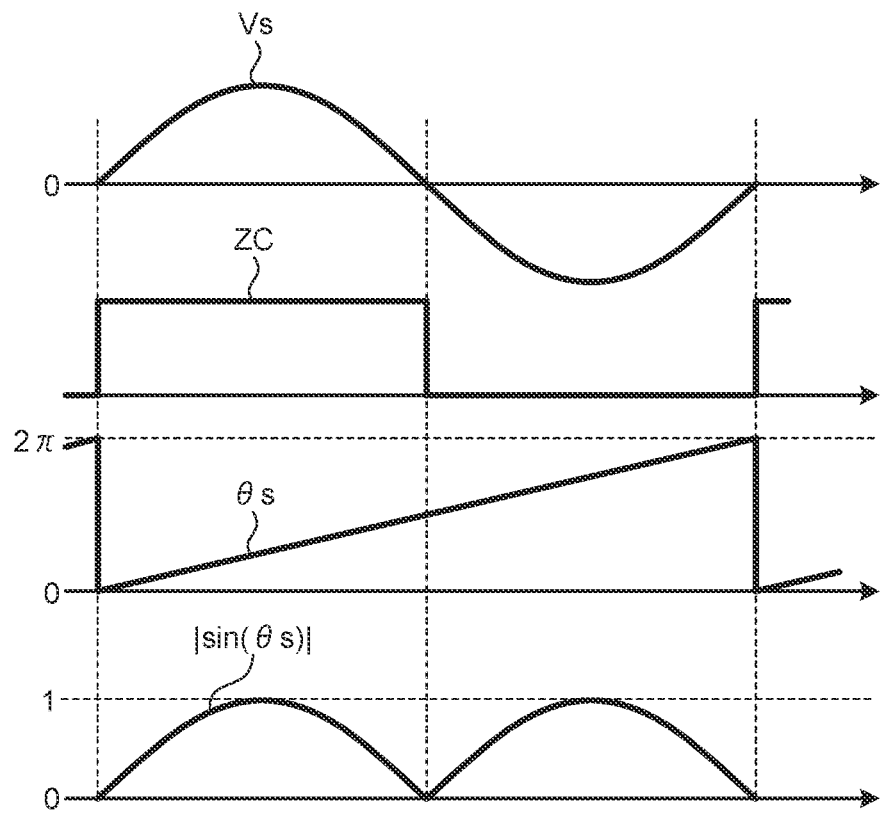
FIG. 11 is a chart illustrating the relation between a zero-crossing signal and a phase of a power supply voltage used in computation of the control unit of the power converting apparatus according to the first embodiment.

FIG. 11 is a chart illustrating the relation between the zero-crossing signal and the phase θs of the power supply voltage Vs used in computation of the control unit 10 of the power converting apparatus 100 according to the first embodiment. The control unit 10 counts the phase θs of the power supply voltage Vs between 0 and 2π by using the zero-crossing signal depending on the polarity of the power supply voltage Vs of the alternating-current power supply 1. While the control unit 10 resets the phase θs of the power supply voltage Vs to 0 at the rise of the zero-crossing signal in FIG. 11, this is an example, and the resetting is not limited thereto. The control unit 10 may reset the phase θs of the power supply voltage Vs to 0 at the fall of the zero-crossing signal, or may reset the phase θs of the power supply voltage Vs to 0 both at the rise and at the fall of the zero-crossing signal. The control unit 10 computes Duty*, which is the command duty, by the procedures illustrated in FIG. 10. As illustrated in FIG. 9, the control unit 10 generates driving signals for the switching elements 321 and 322 on the basis of the magnitudes of the carrier signal of a triangular wave and Duty*, which is the command duty. The control unit 10 generates the driving signals for the switching elements 311 and 312 in accordance with the operation of synchronous rectification illustrated in FIG. 6. As illustrated in FIG. 8, the control unit 10 can also perform diode rectification control in which the switching elements 311 and 312 are always OFF. Note that the configuration of the control unit 10 illustrated in FIG. 10 is an example, and the control unit 10 is not limited thereto.

Figure 12:
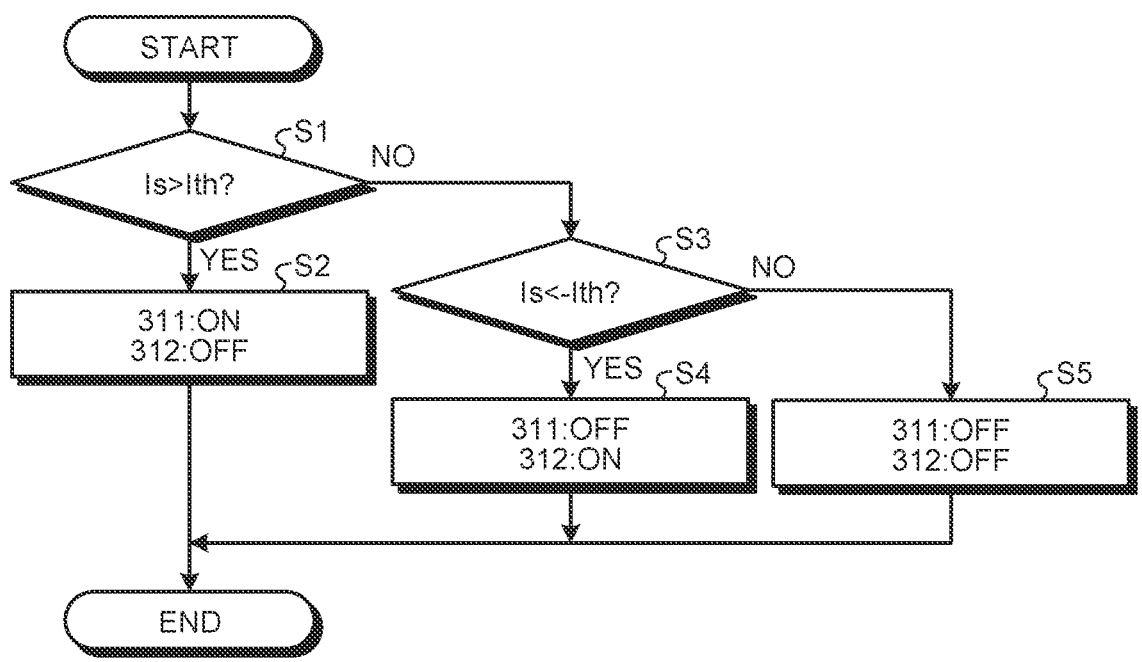
FIG. 12 is a flowchart illustrating an example of control processes of synchronous rectification control using switching elements performed by the control unit of the power converting apparatus according to the first embodiment.
Figure 13:
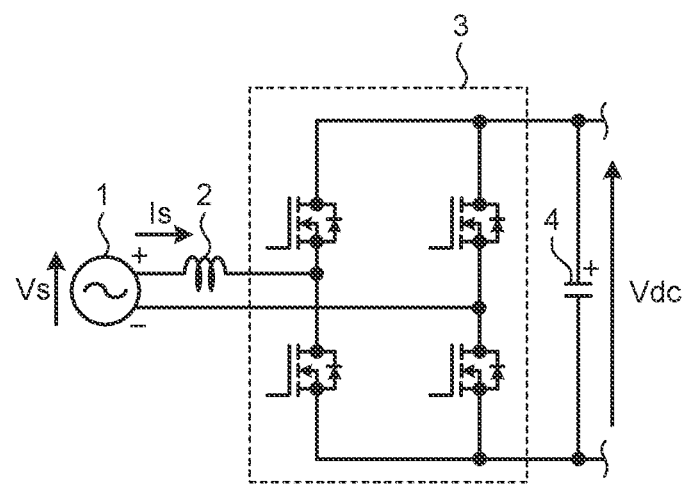
FIG. 13 is a diagram illustrating the polarities of the voltage and the current in the power converting apparatus according to the first embodiment.

FIG. 12 is a flowchart illustrating an example of control processes of the synchronous rectification control using the switching elements 311 and 312 performed by the control unit 10 of the power converting apparatus 100 according to the first embodiment. FIG. 13 is a diagram illustrating the polarities of the voltage and the current in the power converting apparatus 100 according to the first embodiment. The polarity of the voltage and the polarity of current illustrated in FIG. 13 are defined to be positive here. The control unit 10 determines the ON/OFF states of the switching elements 311 and 312 on the basis of the power supply current Is detected by the power supply current detecting unit 6. When the power supply current Is has positive polarity and is larger than the current threshold Ith (step S1: Yes), the control unit 10 turns the switching element 311 ON and the switching element 312 OFF (step S2). When the power supply current Is has negative polarity and is smaller than −Ith, which is a negative value of the current threshold Ith, (step S1: No, step S3: Yes), the control unit 10 turns the switching element 311 OFF, and the switching element 312 ON (step S4). When neither of the aforementioned two conditions is met (step S3: No), the control unit 10 turns both of the switching elements 311 and 312 OFF (step S5). The control unit 10 achieves the synchronous rectification control of the switching elements 311 and 312 by the control processes illustrated in FIG. 12. Note that the control processes illustrated in FIG. 12 are an example, and the control unit 10 may use a method of control processes other than the control processes illustrated in FIG. 12.

Figure 14:
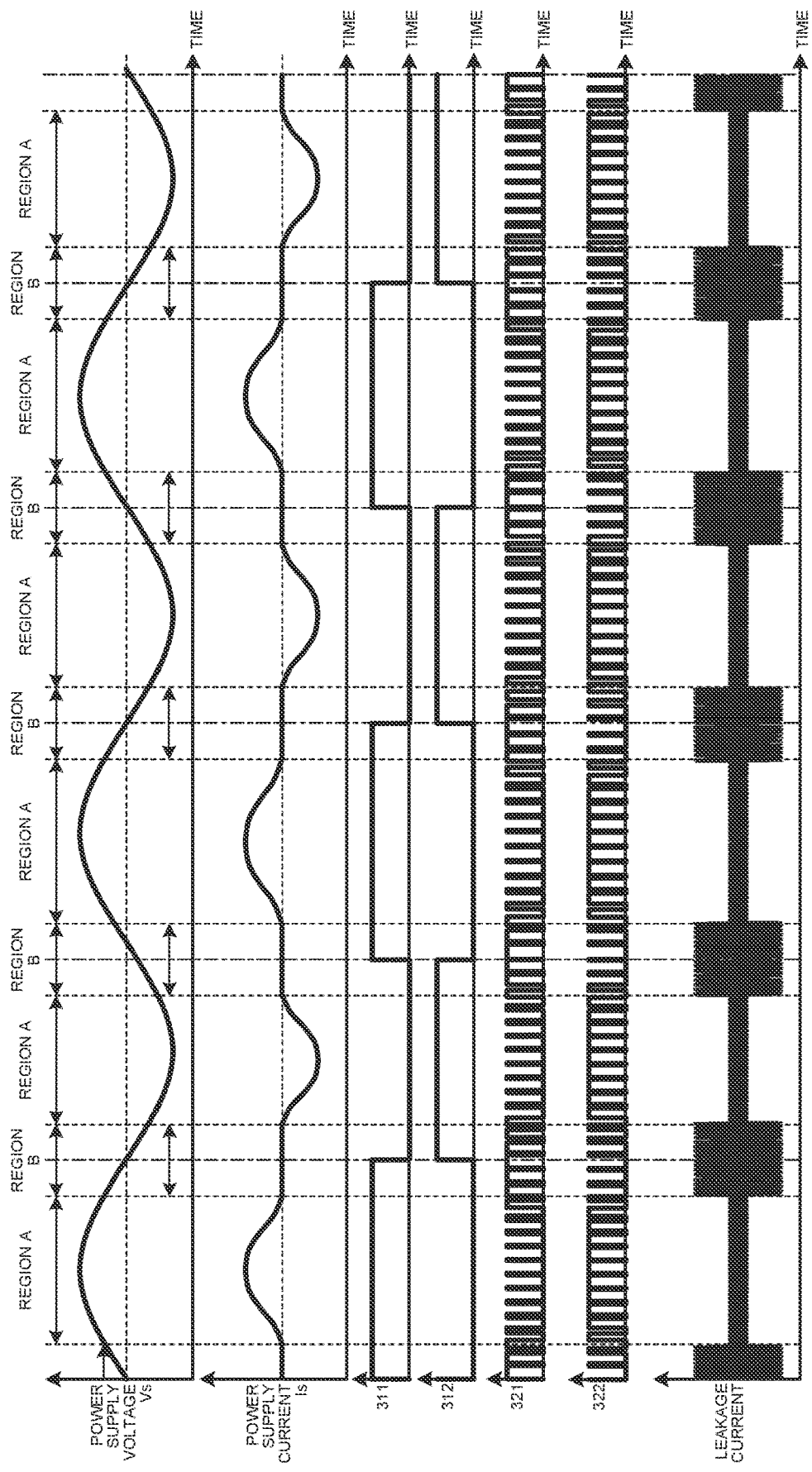
FIG. 14 is a chart illustrating the relation between leakage current in the power converting apparatus according to the first embodiment and the operation states of the individual switching elements.

Next, control for reducing leakage current caused by the switching elements 311 to 322 during the operation of the rectifier circuit 3 in the power converting apparatus 100 will be described. FIG. 14 is a chart illustrating the relation between leakage current in the power converting apparatus 100 according to the first embodiment and the operation states of the individual switching elements. FIG. 14 illustrates a waveform of the power supply voltage Vs, a waveform of the power supply current Is, a drain-source waveform of the switching element 311, a drain-source waveform of the switching element 312, a drain-source waveform of the switching element 321, a drain-source waveform of the switching element 322, and a waveform of a leakage current, in this order from the top. The waveforms illustrated in FIG. 14 show the operation state of the power converting apparatus 100 when used in a system including a compressor of an air conditioner, an inverter, and the like. As illustrated in FIG. 14, it can be seen that the peaks of the leakage current in regions B are increased as compared with the peaks of the leakage current in regions A. Note that the regions B can be said to be regions in which the power supply current Is is discontinuous, that is discontinuous regions of the power supply current Is. The regions B are regions around zero-crossings including zero-crossings of the power supply voltage Vs.

Figure 15:
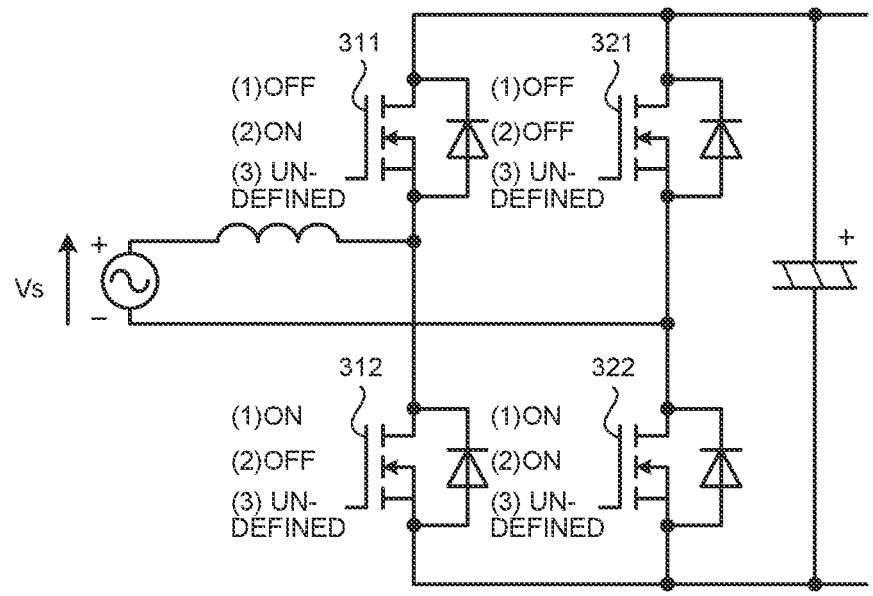
FIG. 15 is a diagram schematically illustrating the behavior of the rectifier circuit when the power supply current is in a discontinuous region in the power converting apparatus according to the first embodiment.
Figure 16:
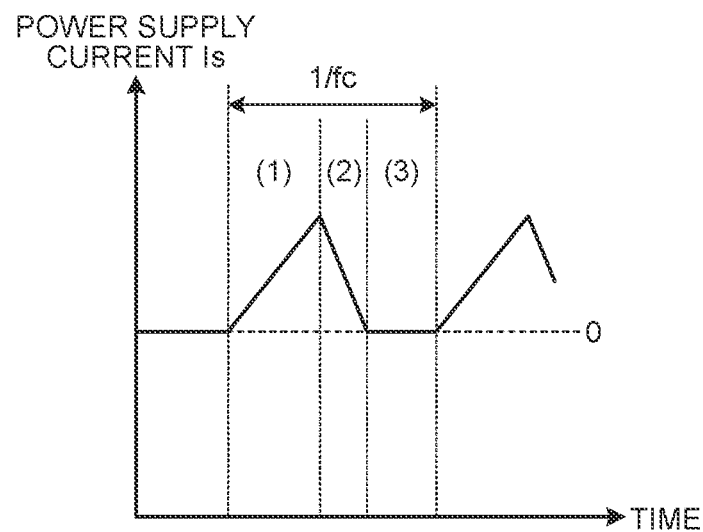
FIG. 16 is a chart illustrating the power supply current detected in a switching state illustrated in FIG. 15 in the power converting apparatus according to the first embodiment.

FIG. 15 is a diagram schematically illustrating the behavior of the rectifier circuit 3 when the power supply current Is is in a discontinuous region in the power converting apparatus 100 according to the first embodiment. FIG. 16 is a chart illustrating the power supply current Is detected in a switching state illustrated in FIG. 15 in the power converting apparatus 100 according to the first embodiment. First, the power converting apparatus 100 enters the power supply short circuit mode in a stage (1), and the power supply current Is thus increases. Thereafter, the power converting apparatus 100 shifts into the load power supply mode, and the power supply current Is does not flow in a stage (3). As illustrated in (3) in FIG. 16, a region including a period in which the power supply current Is does not flow, that is, the power supply current Is is zero, corresponds to a discontinuous region of the power supply current Is described above. In this case, in the power converting apparatus 100, as a result of the power supply current Is and the current caused to flow by the energy accumulated in the reactor 2 in a stage (2), the ON and OFF states of the switching elements 311 to 322 are fixed. When the power converting apparatus 100 shifts into the stage (3), however, the power supply current Is does not flow, and the drain potentials and the source potentials of the switching elements 311 to 322 become indefinite. In this case, in the power converting apparatus 100, charge/discharge currents of parasitic capacitances of the switching elements 311 to 322 are converted into leakage current, which increases the leakage current.

Figure 17:
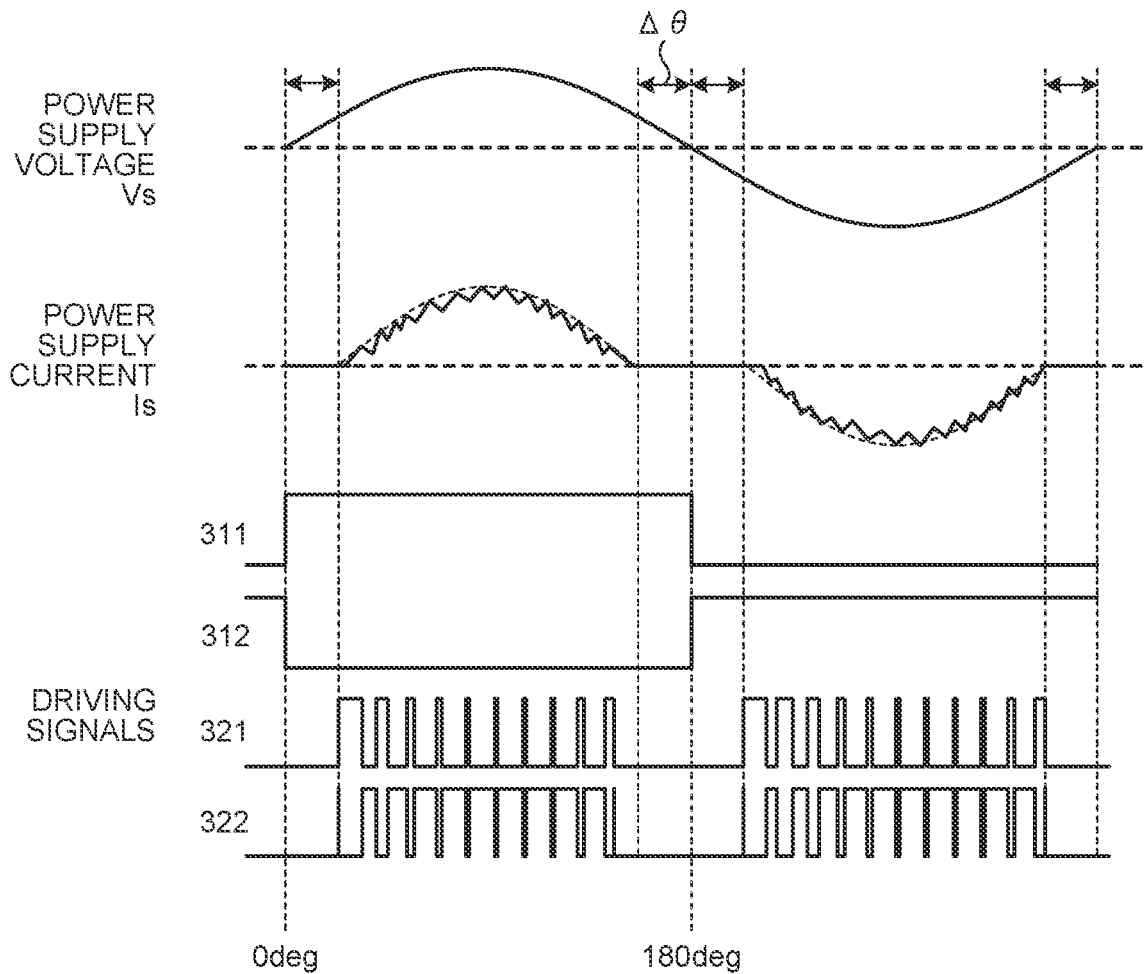
FIG. 17 is a chart illustrating details of control for reducing leakage current performed by the control unit of the power converting apparatus according to the first embodiment.

Thus, in the present embodiment, the control unit 10 of the power converting apparatus 100 sets switching stop ranges $\Delta\theta$ having the centers at the zero-crossings around zero-crossings at which the phases $\theta$s of the power supply voltage are 0 degrees or 180 degrees. A switching stop range $\Delta\theta$ is a range, that is, a phase in which the switching of the switching elements 321 and 322 is stopped. FIG. 17 is a chart illustrating details of the control for reducing the leakage current performed by the control unit 10 of the power converting apparatus 100 according to the first embodiment. As described above, because the leakage current increases as a result of switching of a switching element in a region in which the power supply current Is is discontinuous, the power converting apparatus 100 performs current control. As illustrated in FIG. 17, the control unit 10 of the power converting apparatus 100 stops switching of the switching elements 321 and 322 around the phases of 0 degrees and 180 degrees of the power supply voltage Vs. Specifically, the control unit 10 stops switching of the switching elements 321 and 322 in each of switching stop ranges $\Delta\theta$ before and after the phase of the power supply voltage Vs is 0 degrees, and in each of switching stop range $\Delta\theta$ before and after the phase of the power supply voltage Vs is 180 degrees. As a result, the region in (3) as illustrated in FIG. 16 is eliminated. The control unit 10 can reduce or prevent an increase in the leakage voltage.

Figure 18:
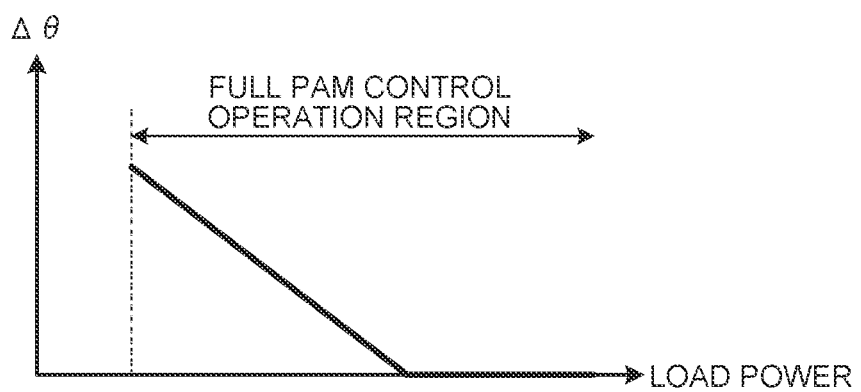
FIG. 18 is a graph illustrating a switching stop range set by the control unit of the power converting apparatus according to the first embodiment.

Note that, as illustrated in FIG. 17, the control unit 10 sets the switching stop ranges $\Delta\theta$ before and after the phases of 0 degrees and 180 degrees of the power supply voltage Vs, in which switching of the switching elements 321 and 322 is stopped. In this case, in the power converting apparatus 100, when the switching of the switching elements 321 and 322 is stopped, power factor correction performance is lowered. The control unit 10 therefore preferably adjusts the switching stop ranges $\Delta\theta$ depending on the load power, the power supply current Is, and the like. FIG. 18 is a graph illustrating a switching stop range $\Delta\theta$ set by the control unit 10 of the power converting apparatus 100 according to the first embodiment. FIG. 18 illustrates an example of control in which the control unit 10 makes the switching stop range $\Delta\theta$ smaller and finally become zero as the load power increases in an operation region of full PAM control. As illustrated in FIG. 18, the control unit 10 can achieve a trade-off between an increase in leakage current and the power factor correction performance by controlling the switching stop range $\Delta\theta$.

While the case where the control unit 10 stops the switching depending on the phase of the power supply voltage Vs has been described, the control unit 10 is not limited thereto. The control unit 10 can produce similar effects by controlling the switching stop ranges Δθ by using interchangeable physical quantities such as a detected value of the power supply voltage Vs. As described above, the control unit 10 changes the numbers of times of switching of the individual switching elements 311 to 322 depending on the operation of the rectifier circuit 3. In the first embodiment, the control unit 10 stops switching of the switching elements 321 and 322 in a specified range of the phase of the power supply voltage Vs, which is an alternating-current voltage output from the alternating-current power supply 1, including a zero-crossing at which the polarity of the alternating-current voltage changes, that is, in a switching stop range Δθ. The control unit 10 changes the specified phase range depending on the load power to be supplied to the load 50 connected to the power converting apparatus 100.

The operation of the control unit 10 will be explained with reference to a flowchart. FIG. 19 is a flowchart illustrating the operation of the control unit 10 of the power converting apparatus 100 according to the first embodiment. The control unit 10 acquires physical quantities indicating the operation state of the rectifier circuit 3 from at least one of the power supply voltage detecting unit 5, the power supply current detecting unit 6, the bus voltage detecting unit 7, and the zero-crossing detecting unit 9 (step S11). The control unit 10 sets switching stop ranges Δθ by using the acquired physical quantities (step S12). The control unit 10 generates driving signals for the individual switching elements by using the acquired physical quantities and the set switching stop ranges Δθ (step S13).

Next, a hardware configuration of the control unit 10 of the power converting apparatus 100 will be described. FIG. 20 is a diagram illustrating an example of the hardware configuration for implementing the control unit 10 of the power converting apparatus 100 according to the first embodiment. The control unit 10 is implemented by a processor 201 and a memory 202.

The processor 201 is a central processing unit (CPU; also referred to as a central processing device, a processing device, a computing device, a microprocessor, a microcomputer, a processor, or a digital signal processor (DSP)), or a system large scale integration (LSI). Examples of the memory 202 can include nonvolatile or volatile semiconductor memories such as a random access memory (RAM), a read only memory (ROM), a flash memory, an erasable programmable read only memory (EPROM), and an electrically erasable programmable read only memory (EEPROM: registered trademark). The memory 202 is not limited thereto, and may be a magnetic disk, an optical disk, a compact disk, a mini disc, or a digital versatile disc (DVD).

As described above, according to the present embodiment, in the power converting apparatus 100, the control unit 10 sets switching stop ranges Δθ before and after the phases of 0 degrees and 180 degrees of the power supply voltage Vs, and stops switching of the switching elements 321 and 322 in the switching stop ranges Δθ. In this manner, the control unit 10 can reduce or prevent an increase in the leakage voltage.

Second Embodiment

In a second embodiment, leakage current is reduced by changing switching frequency.

Figure 21:
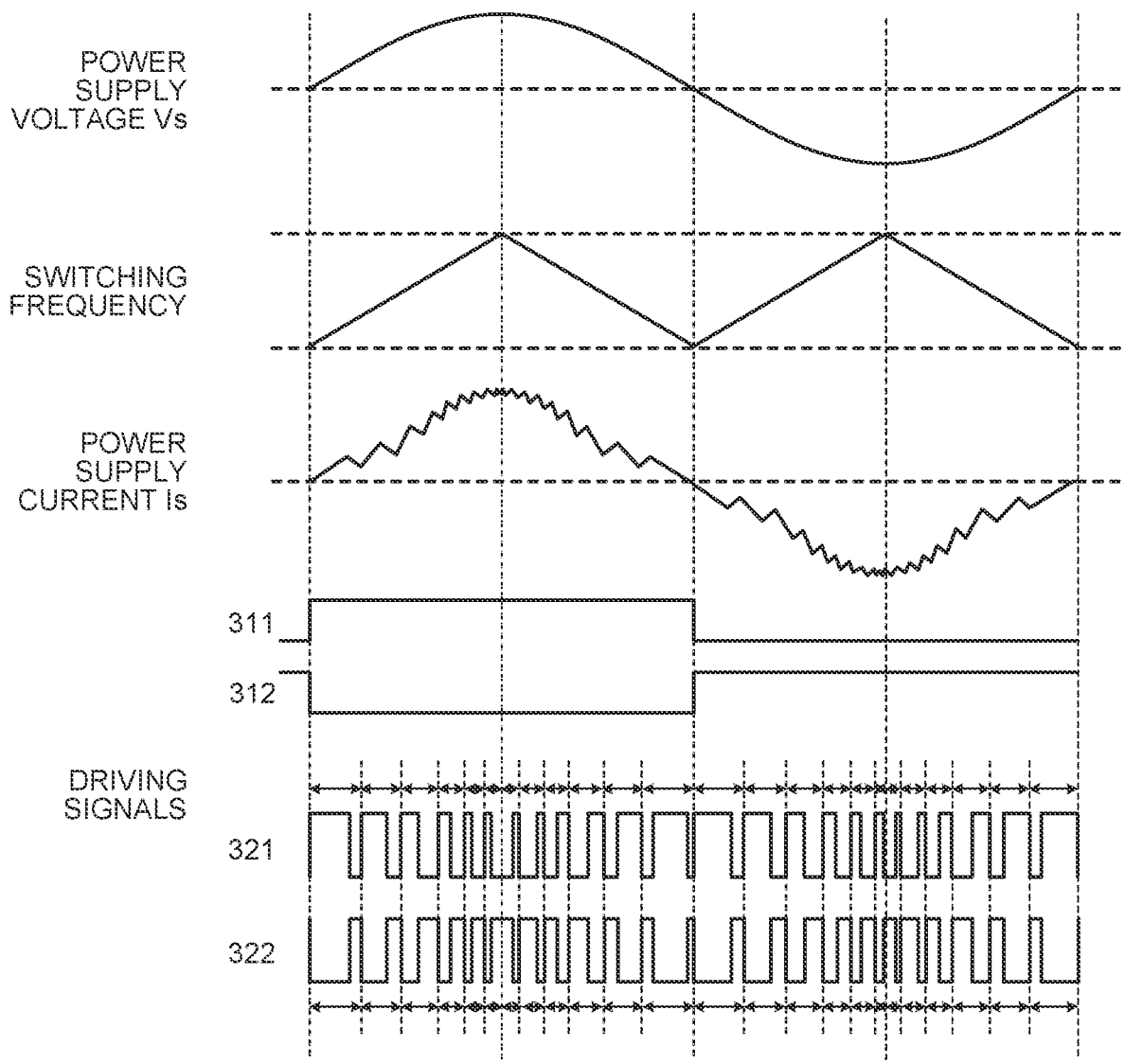
FIG. 21 is a chart illustrating details of control for reducing leakage current performed by a control unit of a power converting apparatus according to a second embodiment.

In the second embodiment, the power converting apparatus 100 has a configuration similar to that in the first embodiment illustrated in FIG. 1. FIG. 21 is a chart illustrating details of control for reducing the leakage current performed by the control unit 10 of the power converting apparatus 100 according to the second embodiment. FIG. 21 illustrates that the control unit 10 of the power converting apparatus 100 changes the switching frequency of the rectifier circuit 3 for the switching elements 321 and 322 to be in a triangular waveform. Specifically, the control unit 10 causes the switching frequency to be small around zero-crossings of the power supply voltage Vs. The power converting apparatus 100 makes the switching frequency small around zero-crossings of the power supply voltage Vs, which makes the switching periods around the zero-crossings longer, and thus can increase the time during which the power supply short circuit mode can be formed. Thus, in the power converting apparatus 100, the time during which energy is accumulated in the reactor 2 increases, which makes the power supply current less likely to be discontinuous. In the power converting apparatus 100, the power supply current Is does not become discontinuous, which makes the peak of the leakage current less likely to increase.

As described above, according to the present embodiment, in the power converting apparatus 100, the control unit 10 makes the switching frequency small around zero-crossings of the power supply voltage Vs.

Specifically, the control unit 10 changes the switching periods of the switching elements 321 and 322 depending on the phase of the alternating-current voltage. This makes the power supply current less likely to be discontinuous, and the power converting apparatus 100 can thus reduce occurrence of leakage current.

Third Embodiment

In a third embodiment, leakage current is reduced by changing the shape of a current command value used by the control unit 10 in computation for generating driving signals.

Figure 22:
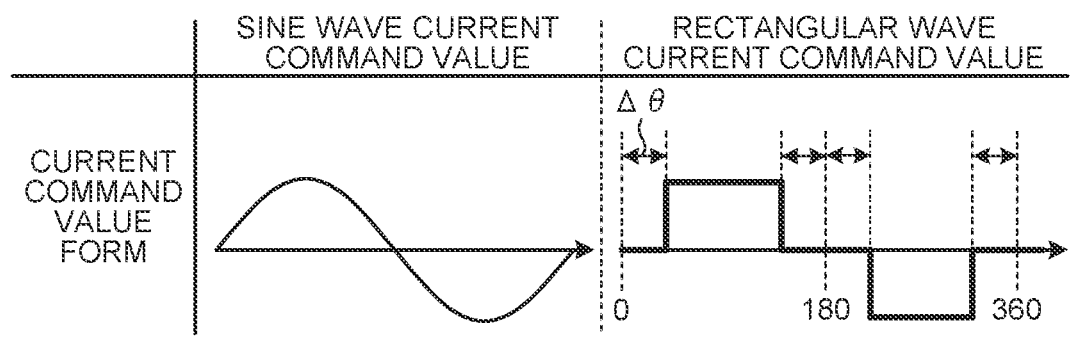
FIG. 22 is a diagram illustrating an example of a current command value used by a control unit of a power converting apparatus according to a third embodiment.

In the third embodiment, the power converting apparatus 100 has a configuration similar to that in the first embodiment illustrated in FIG. 1. FIG. 22 is a diagram illustrating an example of a current command value used by the control unit 10 of the power converting apparatus 100 according to the third embodiment. In FIG. 22, a sine wave on the left side is a sine wave current command value used in the case where the control unit 10 performs computation by the configuration illustrated in FIG. 10 in the first embodiment. In FIG. 22, a rectangular wave on the right side is a phase-adjusted rectangular wave current command value used in a case where the control unit 10 performs computation by the configuration illustrated in FIG. 10 in the third embodiment. The rectangular wave current command value illustrated in FIG. 22 includes switching stop ranges Δθ set before and after the power supply voltage phases of 0 degrees and 180 degrees, that is, zero-crossings.

As explained in the first embodiment, the control unit 10 performs current feedback control in the full PAM control. In the current feedback control, the control unit 10 performs PI control using a difference between a detected value of the power supply current and the current command value. Note that, according to the waveform of the power supply current Is in a passive state, because the power supply current Is does not flow around a zero-crossing of the power supply voltage Vs, that is, in a region where power supply voltage Vs<bus voltage, the difference to be input to the current feedback control is zero. In this case, Duty* computed in current feedback control by the control unit 10 is necessarily zero. When Duty* is zero, the power converting apparatus 100 stops switching of the switching elements 311 to 322.

As described above, according to the present embodiment, in the power converting apparatus 100, the control unit 10 uses the rectangular wave current command value including the set switching stop ranges $\Delta\theta$ as the current command value in the current feedback control. The control unit 10 sets the current command value, which is to be used in current feedback control for generating driving signals for the switching elements, in a rectangular waveform, and to be zero in a specified range of the phase of the alternating-current voltage including a zero-crossing at which the polarity of the alternating-current voltage changes. As a result, the power converting apparatus 100 can prevent increase in leakage current in a discontinuous region of the power supply current Is.

Fourth Embodiment

In a fourth embodiment, a motor driving apparatus including the power converting apparatus 100 described in the first embodiment will be described.

Figure 23:
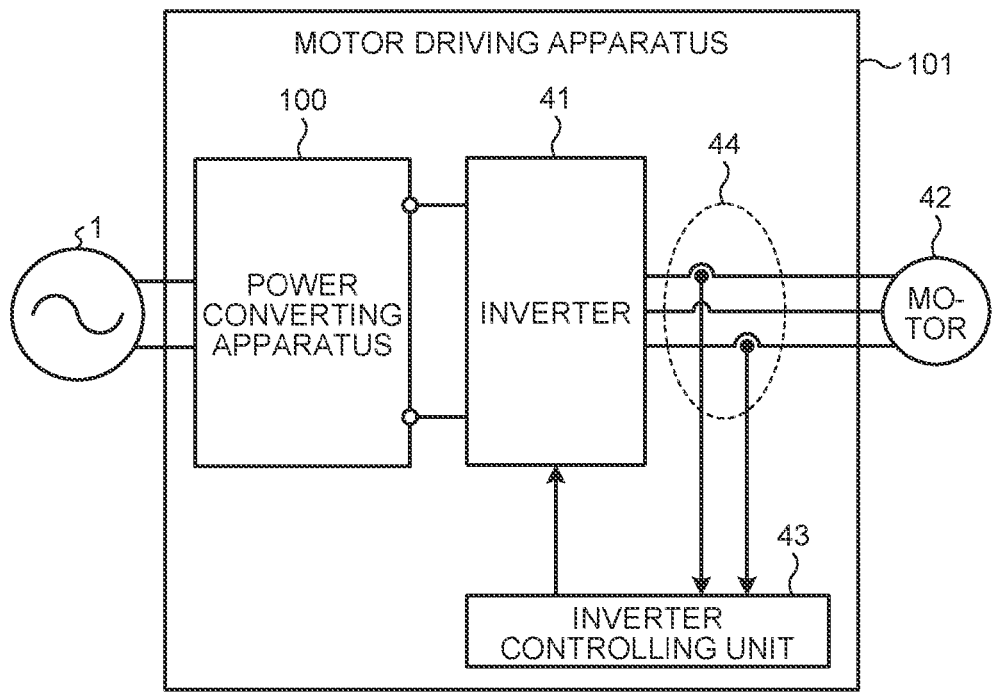
FIG. 23 is a diagram illustrating an example of a configuration of a motor driving apparatus according to a fourth embodiment.

FIG. 23 is a diagram illustrating an example of a configuration of a motor driving apparatus 101 according to the fourth embodiment. The motor driving apparatus 101 drives a motor 42 that is a load. The motor driving apparatus 101 includes the power converting apparatus 100 of the first embodiment, an inverter 41, a motor current detecting unit 44, and an inverter controlling unit 43. The inverter 41 drives the motor 42 by converting a direct-current power supplied from the power converting apparatus 100 into an alternating-current power and outputting the alternating-current power to the motor 42. While an example in which the load of the motor driving apparatus 101 is the motor 42 is described, this is an example, and a device connected to the inverter 41 may be any device other than the motor 42, as long as an alternating-current power is input to the device.

The inverter 41 is a circuit including switching elements, including insulated gate bipolar transistors (IGBTs), in a three-phase bridge configuration or a two-phase bridge configuration. The switching elements included in the inverter 41 are not limited to IGBTs, but may be switching elements made of WBG semiconductors, integrated gate commutated thyristors (IGBTs), field effect transistors (FETs), or MOSFETs.

The motor current detecting unit 44 detects a current flowing between the inverter 41 and the motor 42. The inverter controlling unit 43 generates PWM signals for driving the switching elements in the inverter 41 by using a current detected by the motor current detecting unit 44 so that the motor 42 rotates at a desired rotating speed, and applies the PWM signals to the inverter 41. The inverter controlling unit 43 is implemented by a processor and a memory in a manner similar to the control unit 10. Note that the inverter controlling unit 43 of the motor driving apparatus 101 and the control unit 10 of the power converting apparatus 100 may be implemented by one circuit.

In a case where the power converting apparatus 100 is used in the motor driving apparatus 101, the bus voltage Vdc necessary for controlling the rectifier circuit 3 changes depending on the operation state of the motor 42. Typically, as the rotating speed of the motor 42 is higher, the voltage output from the inverter 41 needs to be higher. The upper limit of the voltage output from the inverter 41 is limited by a voltage input to the inverter 41, that is, the bus voltage Vdc that is output from the power converting apparatus 100. A region in which the voltage output from the inverter 41 exceeds the upper limit limited by the bus voltage Vdc and is saturated is called an overmodulation region.

In the motor driving apparatus 101 as described above, the bus voltage Vdc need not be increased in a low rotation range of the motor 42, that is, in a range in which the overmodulation region is not reached. In contrast, when the motor 42 rotates at high speed, the overmodulation region can be shifted toward higher rotation by increasing the bus voltage Vdc. As a result, the operation range of the motor 42 can be expanded toward higher rotation.

In addition, when the operation range of the motor 42 need not be expanded, the number of coil turns around a stator of the motor 42 can be increased by a corresponding amount. In the low rotation region, the increase in the number of coil turns makes the motor voltage generated across both ends of the coil higher and lowers the current flowing in the coil accordingly, which reduces the loss caused by the switching operations of the switching elements in the inverter 41. For producing both effects of expansion of the operation range of the motor 42 and improvement in the loss in the low rotation region, the number of coil turns of the motor 42 is set to an appropriate value.

As described above, according to the present embodiment, the use of the power converting apparatus 100 enables the motor driving apparatus 101 with reduced imbalance in heat generation between the arms, high reliability, and high power to be achieved.

Fifth Embodiment

In a fifth embodiment, an air conditioner including the motor driving apparatus 101 described in the fourth embodiment will be described.

Figure 24:
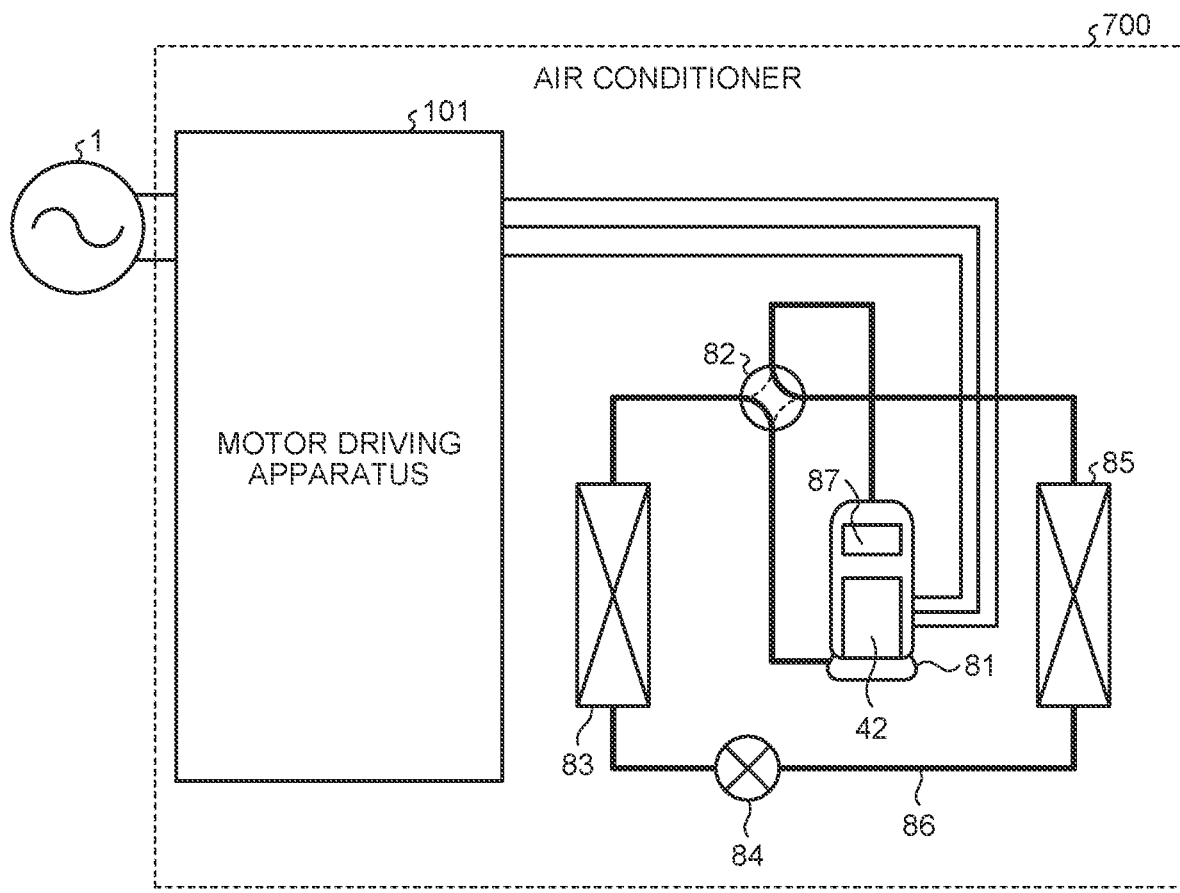
FIG. 24 is a diagram illustrating an example of a configuration of an air conditioner according to a fifth embodiment.

FIG. 24 is a diagram illustrating an example of a configuration of an air conditioner 700 according to the fifth embodiment. The air conditioner 700 is an example of a refrigeration cycle system, and includes the motor driving apparatus 101 and the motor 42 according to the fourth embodiment. The air conditioner 700 includes a compressor 81 including a compression mechanism 87 and the motor 42, a four-way valve 82, an external heat exchanger 83, an expansion valve 84, an internal heat exchanger 85, and refrigerant piping 86. The air conditioner 700 is not limited to a split air conditioner in which an outdoor unit is separated from an indoor unit, and may be an integrated air conditioner in which the compressor 81, the internal heat exchanger 85, and the external heat exchanger 83 are arranged in one housing. The motor 42 is driven by the motor driving apparatus 101.

The compressor 81 includes therein the compression mechanism 87 for compressing the refrigerant, and the motor 42 for causing the compression mechanism 87 to operate. A refrigeration cycle is constituted by circulation of refrigerant through the compressor 81, the four-way valve 82, the external heat exchanger 83, the expansion valve 84, the internal heat exchanger 85, and the refrigerant piping 86. Note that the components of the air conditioner 700 can also be applied to such equipment as a refrigerator or a freezer including a refrigeration cycle.

In addition, in the present embodiment, an example of a configuration in which the motor 42 is used as a driving source of the compressor 81 and the motor 42 is driven by the motor driving apparatus 101 is described. The motor 42, however, may be applied to a driving source for driving an indoor unit fan and an outdoor unit fan, which are not illustrated, included in the air conditioner 700, and the motor 42 may be driven by the motor driving apparatus 101. Alternatively, the motor 42 may be applied to driving sources of the indoor unit fan, the outdoor unit fan, and the compressor 81, and the motor 42 may be driven by the motor driving apparatus 101.

In addition, because the operation of the air conditioner 700 under an intermediate condition in which the power output is equal to or lower than half of a rated power output, that is, under a low power condition is dominant throughout the year, the contribution to the annual power consumption under the intermediate condition is high. In addition, in the air conditioner 700, the rotating speed of the motor 42 tends to be low, and the bus voltage Vdc required for driving the motor 42 tends to be low. Thus, operation of the switching elements used in the air conditioner 700 in a passive state is effective in terms of system efficiency. The power converting apparatus 100 capable of reducing the loss in a wide range of operation modes from the passive state to the high-frequency switching state is therefore useful for the air conditioner 700. Although the reactor 2 can be reduced in size according to the interleaving method as described above, the frequency of operation of the air conditioner 700 under the intermediate condition is high, and thus the reactor 2 need not be reduced in size; rather, the configurations and operations of the power converting apparatus 100 are more effective in terms of harmonic wave prevention and the power-supply power factor.

In addition, because the power converting apparatus 100 can reduce the switching loss, the increase in the temperature of the power converting apparatus 100 is reduced or prevented, and the capacity of cooling a board mounted on the power converting apparatus 100 can be ensured even when the outdoor unit fan, which is not illustrated, is reduced in size. The power converting apparatus 100 is therefore suitable for use in the air conditioner 700 that is highly efficient and has a high power equal to or higher than 4.0 kw.

In addition, according to the present embodiment, the use of the power converting apparatus 100 reduces the imbalance in heat generation between the arms, which enables the reactor 2 to be reduced in size by high-frequency driving of the switching elements, and can reduce or prevent an increase in weight of the air conditioner 700. In addition, according to the present embodiment, high-frequency driving of the switching elements reduces the switching loss, and the air conditioner 700 with a low energy consumption rate and high efficiency can thus be achieved.

The configurations presented in the above embodiments are examples of the present invention, and can be combined with other known technologies or can be partly omitted or modified without departing from the scope of the present invention.

The invention claimed is:

1. A power converting apparatus comprising:
   a reactor including a first end and a second end, the first end being connected to an alternating-current power supply;
   a rectifier circuit connected to the second end of the reactor and including at least one switching element, the rectifier circuit converting an alternating-current voltage output from the alternating-current power supply into a direct-current voltage; and
   a detector that detects a physical quantity indicating an operation state of the rectifier circuit, wherein
   a number of times of switching of some of the at least one switching element that performs switching for power supply short circuit, among the at least one switching element, is changed depending on operation of the rectifier circuit, wherein
   a current command value to be used in current feedback control for generating a driving signal for the switching element is set in a rectangular waveform, the current command value being zero in a range of a phase of the alternating-current voltage including a zero-crossing at which polarity of the alternating-current voltage changes.

2. A motor driving apparatus for driving a motor, comprising:
   the power converting apparatus according to claim 1; and
   an inverter that converts a direct-current power output from the power converting apparatus into an alternating-current power, and outputs the alternating-current power to the motor.

* * * * *